(12) United States Patent
Matsunaga et al.

(10) Patent No.: US 6,593,280 B2
(45) Date of Patent: Jul. 15, 2003

(54) FRICTION REDUCING COATING FOR ENGINEERING WORKS, AND SHEET PILE, STEEL TUBULAR PIPE AND CONSTRUCTION METHOD

(75) Inventors: Toshiaki Matsunaga, Suita (JP); Yohei Murakami, Suita (JP); Akira Hattori, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/925,505

(22) Filed: Aug. 10, 2001

(65) Prior Publication Data

US 2002/0042347 A1 Apr. 11, 2002

(30) Foreign Application Priority Data

Aug. 11, 2000 (JP) .................................... 2000-244083
Aug. 11, 2000 (JP) .................................... 2000-244134

(51) Int. Cl.⁷ .......................... C10M 157/00; C09K 3/00
(52) U.S. Cl. .......................................... 508/100; 106/2
(58) Field of Search .............................. 508/100; 106/2

(56) References Cited

U.S. PATENT DOCUMENTS

| | | | | |
|---|---|---|---|---|
| 4,771,105 A | * | 9/1988 | Shirai et al. .............. | 525/54.23 |
| 5,075,373 A | * | 12/1991 | Takemori et al. .............. | 525/57 |
| 5,750,620 A | * | 5/1998 | Davies et al. .............. | 525/67 |
| 5,914,384 A | * | 6/1999 | Anton et al. .............. | 528/83 |
| 5,948,851 A | * | 9/1999 | Anton et al. .............. | 524/520 |
| 5,955,402 A | * | 9/1999 | Hirata et al. .............. | 508/106 |
| 5,962,376 A | * | 10/1999 | Yamazaki et al. .......... | 508/106 |
| 6,323,268 B1 | * | 11/2001 | Fisher et al. ................ | 524/266 |
| 6,403,163 B1 | * | 6/2002 | Fisher et al. ................ | 427/387 |

* cited by examiner

*Primary Examiner*—Ellen M. McAvoy
(74) *Attorney, Agent, or Firm*—Sughrue Mion, PLLC

(57) ABSTRACT

The present invention has its object to provide a friction reducing coating for engineering works, and, a soil adhesion-preventing sheet pile or steel tubular pipe wherein the above-mentioned friction reducing coating for engineering works applied thereto in advance, and, a soil adhesion-preventing construction method which comprises using the above-mentioned friction reducing coating for engineering works and/or the above-mentioned soil adhesion-preventing sheet pile or steel tubular pipe and further provide a negative friction cut construction method for foundation structures which comprises using the above friction reducing coating for engineering works and thus can cut the friction between a foundation structure after laying underground and the surrounding ground and reduce the influences of changes in the surrounding ground on the foundation structure as well as a caisson or pipe jacking construction method which comprises using the above friction reducing coating for engineering works and can reduce the friction between the substrate and soil while minimizing the influences on the surrounding ground and thus can markedly improve the speed and efficiency of construction work. A friction reducing coating for engineering works comprising a water-absorbing resin (a), a hydrophilic binder resin (b) and a solvent (c) as essential components, wherein said hydrophilic binder resin (b) has an acid value of 40 mg KOH/g to 500 mg KOH/g.

9 Claims, 3 Drawing Sheets

(2 of 3 Drawing Sheet(s) Filed in Color)

FRICTION REDUCING COATING FOR ENGINEERING WORKS, AND SHEET PILE, STEEL TUBULAR PIPE AND CONSTRUCTION METHOD

TECHNICAL FIELD

The present invention relates to a friction reducing coating for engineering works, and, a soil adhesion-preventing sheet pile or steel tubular pipe with the same applied thereto and a soil adhesion-preventing construction method, a negative friction cut construction method, caisson construction method or pipe jacking construction method using the same.

More particularly, it relates to a friction reducing coating for engineering works which, when applied in advance to steel materials for temporary works to be extracted and recovered after completion of the works, such as sheet piles frequently utilized in underground excavation, underground foundation structure laying and the like utilizing shoring walls, prevents soil from adhering to the steel materials for temporary work after extraction, to a soil adhesion-preventing sheet pile and a soil adhesion-preventing steel tubular pipe, each coated in advance with the friction reducing coating for engineering works, and to a soil adhesion-preventing construction method which comprises using the friction reducing coating for engineering works and/or the soil adhesion-preventing sheet pile or steel tubular pipe.

It also relates to a friction reducing coating for engineering works which, when applied in advance to substrates, such as various tanks, water storage tanks and so forth, in applying a caisson construction method for laying such substrates underground in laying various foundation structures underground or, when applied in advance to such substrates as various Hume pipes, steel pipes or steel pipe piles in applying a pipe jacking construction method for laying such substrates underground (horizontally or vertically), reduces the friction between the various foundation structures and the ground, prevents the foundation structures from being damaged due to ground subsidence or changes in surrounding ground conditions and reduces the friction between the substrate surface and the soil to thereby make it easy to lay the substrates underground (speedup of laying, reduction in pushing force, etc.), and to a negative friction cut construction method, caisson construction method or pipe jacking construction method for laying foundation structures which uses the above-mentioned friction reducing coating for engineering works.

In the present invention, the term of "engineering works" especially relates to "constructional engineering works" which means all types of constructional (erecting of buildings, parts of buildings and the like) work beneath the soil surface, such as placing and fastening substrates in the underground (soil). The term of "a negative friction" means the friction between the structure laid underground and the surrounding ground (soil) and by which the structure are damaged in case of the ground subsidence in the surrounding, for instance. The term of "a negative friction cut construction method" means that a building method wherein at least one substrate or part of a substrate is placed and fastened in the underground in a manner wherein the friction between the substrate surface and the soil material of the underground is reduced.

BACKGROUND ART

In foundation and like works in the field of construction and engineering works (civil engineering), it has been earnestly desired that the equipment, expenses and days required for the works be curtailed to thereby improve the work efficiency and that such troubles as damages to the foundation structures laid in the ground, which require much labor for repair or restoration, be prevented from occurring. If improvements are achieved in these aspects, it will become possible to curtail the foundation work cost and finish the works speedily.

In such and like foundation works, the art has so far encountered the problem that soil in the ground adheres to and is carried by temporary work steel materials such as sheet piles frequently used in underground excavation, underground foundation structure laying and the like utilizing shoring walls when those steel materials are extracted and recovered.

Such recovered temporary work steel materials (e.g. sheet piles) with soil adhering thereto produce problems, for example ① they create voids in the ground, hence the ground may be distorted and ground subsidence or the like may occur, possibly resulting in damages to the neighboring structures, ② much labor and cost are required to backfill for preventing the troubles mentioned above under ①, ③ the steel materials after recovery can hardly be piled up in parallel, so that temporary storage thereof after recovery becomes difficult and ④ since it is a precondition that such temporary work steel materials are reused after recovery, it is necessary for a constructor to pay the cost of washing if soil remains sticking to the temporary work steel materials when these are returned to a leasing company. Under the existing circumstances, it is therefore a general practice for a constructor to remove the adhering soil manually or pay high washing expenses to a leasing company.

To solve these problems, such technologies as mentioned below have so far been proposed.

First, JP Kokai Publication Hei-06-71241 proposes a mud-removing line (equipment) for sheet piles which comprises ① a mud removing apparatus, ② an earth discharging apparatus and ③ a water washing apparatus and JP Kokai Publication Hei-06-330521 proposes ① an apparatus for removing earth and sand from sheet pile sections which comprises a rotary section for a wound wire and an air spraying section. However, both fail to essentially solve the soil adhesion problem since ① both require the installation of novel apparatus and ② the soil removing work itself is still necessary although the efficiency of the sticking soil removing work may be improved.

In JP Kokoku Publication Sho-61-47253, JP Kokai Publication Sho-60-175628 and JP Kokai Publication Hei-03-279516, it is proposed that a sticking soil scraper matched to the shape of sheet piles be buried adjacently thereto after excavation but before pile extraction so that the buried pipes and the like may be prevented from being deformed by the soil adhering to the sheet piles when these are extracted.

However, this method has problems, for example ① the soil remaining in the gap between the scraper and sheet pile cannot be prevented from sticking to the piles, ② the soil adhesion above the scraper cannot be prevented from sticking to the piles since the scraper is buried relatively lower and ③ time and labor are required for making and placing the scraper matched to the shape of sheet piles.

JP Kokai Publication Hei-03-244711 discloses a method of preventing ground subsidence by extraction of shoring members which comprises filling a solidifying pourable material into voids formed upon extraction of the shoring members. However, this method according to which a roughly U-shaped thin sheet is attached to each shoring member at its lower end and left in the ground when that member is extracted and a solidifying pourable material is poured into the voids after extraction to thereby prevent ground subsidence still has room for contrivance for producing such effects more simply, for example by applying a coating to the surface of temporary work steel materials or the like in advance.

JP Kokai Publication Hei-06-71241 discloses a method of removing mud from sheet piles which comprises piling up and supporting a large number of sheet piles with a U-shaped section with the opening side above at a level higher than a treatment line, allowing the lowest stage sheet pile to fall and feeding the same in the lengthwise direction, cutting off and removing the adhering mud from the internal circumference surface and external circumference surface during feeding, then washing the internal and external surfaces by spraying with a washing liquid and, thereafter, discharging the sheet pile from the treatment line. However, even such method has room for contrivance for removing mud from sheet piles or the like more efficiently, for example by applying a coating to the surface thereof in advance.

As explained hereinabove, there is no method available in the art for the prevention of soil adhesion by a simple procedure independent of the shape of buried temporary work steel materials and with almost no soil sticking (adhesion) to the temporary work steel materials after extraction so that the washing thereof after extraction can be omitted.

In foundation works or the like in the field of construction and engineering work, there are also various problems in the art due to the friction between foundation works or various substrates and the ground (soil) in the caisson construction method or pipe jacking construction method for laying foundation structures and various substrates (tanks, water storage tanks, Hume pipes, steel pipes, steel pipe piles, etc.) underground.

For example, there is the problem that foundation structures laid underground are damaged by the friction (negative friction) between the foundation structure surface and the surrounding ground in case of ground subsidence in the surroundings, for instance.

In the case of a caisson construction method wherein a tanks is sunk underground by digging out the earth and sand from below the tank, the problem is encountered that since no shoring walls are used, the earth pressure is exerted from the ground on a side of the tank on the tank side during the tank sinking procedure, whereby the tank becomes extremely difficult to sink down.

On the other hand, in the case of a pipe jacking construction method, for instance, construction work is generally carried out while pouring a lubricant (e.g. bentonite/water mixture) around the substrate since when the friction between the substrate (e.g. steel pile) and the soil is great, it is difficult to push the substrate ahead. However, such lubricant has problems; for example, it is necessary to make a line for conveying the lubricant, hence a site and labor therefor is required; the lubricant may reduce the strength of the surrounding ground, and the lubricant should be subjected to post-treatment.

For solving these problems, various means of solution have so far been investigated.

Thus, for example, JP Kokai Publication Hei-04-23514 proposes the so-called negative friction cut construction method which comprises inserting a specific film constitution comprising a film (for adhesion to a foundation structure)/lubricant (e.g. oil)/film (on the soil side) between the foundation structure and soil to thereby make it possible to reduce the friction between the foundation structure and soil even in soil poor in water. In this form of working, however, it is a fatal defect that when the foundation structure is first laid underground by a caisson construction method or pipe jacking construction method, for instance, the above film constitution peels off during laying (driving), hence any sufficient or lasting friction reducing effect can no longer be produced. Another problem is that, in view of the structure thereof, the film may readily be peeled off by a slight friction before construction work even in the period from application to laying (burying), hence is difficult to handle.

JP Kokoku Publication Hei-06-39784 proposes that a water-in-oil type water-swellable polymer particle emulsion or an aqueous dispersion thereof be applied in advance to a foundation structure such as a pile to thereby make it possible to reduce the friction between the foundation structure and soil. In this mode of working, too, it is a fatal defect that when the foundation structure is first laid by a caisson construction method or pipe jacking construction method, for instance, the film formed may readily be peeled off during laying. Furthermore, after application to the foundation structure, the film formed by the above emulsion or aqueous dispersion may readily peel off from that foundation structure upon contact with the surroundings, hence any sufficient or lasting friction reducing effect can no longer be produced, like in the above case, and thus is difficult to handle.

On the other hand, JP Kokai publication Sho-63-27619 describes a technique comprising laying underground a foundation structure coated with a mixture composed of a water-swellable powder (e.g. gelatin, agar)/a film-forming, water-absorbing resin (polyvinyl butyral)/an organic solvent; after laying, the coat film swells by absorbing water in the soil and reduces the friction between the foundation structure and soil.

This method, however, is disadvantageous in ① that the balance between the swelling rate and strength of the water-absorbing resin is poor and ② that the balance between the adhesiveness of the binder resin to the steel material and the film strength is also poor (weak adhesivenss and high film strength), hence ① coat film is readily peeled off from the foundation structure during laying (no coat film remains after laying underground, hence no sufficient friction reducing effect can be produced), and ② the film strength after swelling is not sufficient and the friction reducing layer (swollen layer) shows no sustained release property, more concretely there is no sustained friction reducing effect produced, when it is used in a caisson construction method or pipe jacking construction method or the like.

In JP Kokai Publication Sho-58-191816, there is disclosed a method of preventing the bearing pile negative friction in positioning of a bearing pile which method comprises disposing a resin layer of a resin capable of swelling upon absorbing water between the bearing pile and the surrounding ground to thereby form a layer resulting from water absorption and swelling of the above resin layer and, in the example section, the use of an ethanol solution of polyvinyl alcohol or a paste-like polypropylene glycol together with a water-absorbing swelling resin is disclosed. However, it has a problem, namely the water-absorbing resin may not swell adequately or the water-absorbing resin may be peeled off from the substrate surface in the step of driving the substrate into the ground. In the case of foundation work, substrates are driven into the ground in many instances and, therefore, there is room for investigation in search of one capable of producing sufficient effects in these fields of application.

The JP Kokai Publication Hei-11-241339 discloses a surface treatment agent to be caused to adhere to the surface of a member to be buried for the purpose of preventing the adhesion between the member after burying and the hydrate of a hydraulic composition in a structure constituted of at least the buried member and the hydrate of the hydraulic composition which agent comprises a water-swellable resin and an alkaline water-soluble resin having an acid value of not less than 15 mg KOH/g. The use of this surface treatment agent makes it possible to prevent the adhesion between the substrate surface and hydraulic composition and thereby improve the efficiency of foundation work and so on. However, there is no disclosure at all about the application of such agent to the substrate surface results in prevention of the adhesion between substrate surface and ground (soil) and/or reduction in friction therebetween. In addition, there is room for contrivance for allowing the water-absorbing resin to swell more adequately and making the coat film formed from the surface treatment agent to be less peelable from the substrate surface in the step of driving the same into the ground, for instance, in preventing soil adhesion and reducing the friction. In other words, there is room for contrivance for coping with various work methods and work conditions and thereby enlarging the range of application. JP Kokai Publication 2000-44973 discloses a covering material for covering a temporary work which comprises a sheet-like material and a resin layer containing an alkaline water-soluble resin formed thereon. Such covering material, too, has room for contrivance for coping with various work methods and work conditions and thereby still further enlarging the range of application.

JP Kokai Publication Hei-04-122781 discloses a water-swellable coating composition comprising a water-swellable substance, a thermoplastic elastomer, a filler, a surfactant, an antifungal agent and a solvent. JP Kokai Publication Hei-03-157455 discloses a salt-resistant, water-swellable material which comprises a dispersion of a water-absorbing resin obtained by polymerization of a monomer composition comprising a specific sulfonic acid group-containing unsaturated monomer as an essential component in the presence of a crosslinking agent in a base material comprising a thermoplastic resin and/or a rubber. In JP Kokai Publication Sho-60-168653 discloses a method of reducing the negative friction of a pile which comprises providing a layer mainly composed of a macromolecular material soluble or decomposable in water or alkaline water or a layer comprising the same material as a binder around the pile. Further, JP Kokai Publication Sho-49-71712 discloses a method of sinking a caisson which comprises filling the gap between a structure constructed on the ground and the surrounding ground as formed in the step of digging the ground portion below the structure to sink down the same with a lubricating liquid such as a bentonite slurry or heavy water and allowing the structure to sink with a sheet inserted between the lubricating liquid and surrounding ground. And, JP Kokai Publication Hei-05-118190 discloses a lubricant for the pipe jacking construction method which comprises a highly water-absorbing resin prepared by causing clay and a water-soluble macromolecular substance to be included therein. These technologies, however, have room for contrivance for coping with various work methods and work conditions in a simple and adequate manner to thereby produce the desired effects satisfactorily and efficiently.

In JP Publication Kokai Hei-04-231514, there is disclosed a method of laying a foundation structure underground which comprises carrying out, at least once, the step comprising disposing a lubricant material first on one sheet and then placing another sheet on the lubricant material-carrying surface of the first sheet, adhering the thus-formed lubricating sheet to the foundation structure and laying this foundation structure in the ground. However, such a method has room for contrivance for simplifying the same, for example by applying a coating in advance to the surface of a foundation structure or the like. There is also room for contrivance for coping with various work methods and work conditions to thereby enlarge the field of application.

In JP Kokai Publication Sho-63-165615, there is disclosed a method of reducing the frictional resistance by means of a water-swellable film formed by forming a film on the surface of an object to be laid underground by applying thereto a volatile film-forming resin and a highly water-absorbing resin and allowing the highly water-absorbing resin to absorb water and swell. However, such a method is intended for the recovery of steel materials and the like by extracting them from the earth and sand after back filling but is not intended for preventing the adhesion between the substrate surface and ground (soil) or reducing the friction; another problem is that since the volatile film-forming resin forming the water-swellable film is not dissolved in or swelled with water but permeates water to thereby allowing the water-swellable resin to swell, the swelling capacity of the water-absorbing resin is restricted due to the low hydrophilicity of the water-swellable film.

JP Kokai Publication Hei-04-16618 discloses a method of extracting a temporary work steel material inserted into a cement-based self-curing liquid composition after curing of the composition which comprises the step of applying an acrylic resin to the surface of at least that portion of the temporary work steel material which is inserted into the cement-based self-curing liquid composition prior to insertion thereof into the cement-based self-curing liquid composition, wherein the acrylic resin has an acid value sufficient to make the same soluble in an alkali and comprises a mixture of an acrylic emulsion and an aqueous styrene-acrylic resin solution differing in acid value in specified proportions. This method, however, is intended to reduce the friction between the substrate, which is a temporary work steel material, and the product of curing of a cement mortar or the like but is not intended to prevent the adhesion of the substrate surface and ground (soil) or reduce the friction therebetween. The method has another problem that since the peelable layer formed on the temporary work steel material by the acrylic resin contains no water-absorbing resin, the water-absorbing resin-due effects cannot be produced, hence the soil adhesion-preventing and friction reducing effects will not be sufficient.

JP Kokai Publication Hei-11-21473 discloses a water-repellent coating comprising, as main constituents, a solvent-insoluble powder, a solvent-soluble binder resin and a solvent, wherein the powder has a particle size of not less than 0.03 μm. JP Kokai Publication Hei-09-221630 discloses a coating composition comprising a coating containing a reaction-curable organic resin and a hydroxyl-containing polysilsesquioxane the side chain organic groups of which are each composed of a specific substituent and a specific hydroxyl-containing group and the main chain terminal groups of which are trialkylsilylated as incorporated therein. JP Kokai Publication Hei-08-26177 discloses a method of reducing the frictional resistance in water which comprises admixing resin with a powder the surface of which is covered with functional groups capable of reducing the surface energy as a result of binding of a silane coupling agent, typically a fluorine compound, to hydroxyl groups on the powder particle surface at least via siloxane bonding and applying the resulting mixture to the substrate surface. JP Kokai Publication Hei-09-39147 discloses a water-absorbing composite comprising a water-absorbing sheet whose constituent water-absorbing polymer is to be directly fixed onto a substrate and which is at least partly sutured. Further, JP Kokai Publication Hei-02-49079 discloses a coating composition comprising a silyl group- and polysiloxane group-containing vinyl polymer having at least one specific polysiloxane group in each molecule. And JP Kokai Publication Hei-05-271572 discloses a coating composition for forming nonstaining coating films which comprises 10 to 40 parts by weight of a synthetic resin emulsion to constitute a coating resin fraction, 1 to 10 parts by weight of a water-soluble resin and 20 to 90 parts by weight of water. However, these technologies have room for contrivance for enabling them to produce satisfactory effects in using them to prevent the adhesion between the substrate surface and ground (soil) and/or reduce the friction therebetween.

As discussed hereinabove, any good friction reducing agent is not available in the art that can be used in the negative friction cut construction method, caisson construction method and pipe jacking construction method for foundation structures, will seldom peel off in the step of laying the structures underground irrespective of method of laying, can perform the friction reducing function after (during) structure laying and further can provide a friction reducing agent in a sustained manner (sustained release), more concretely can producing a lasting friction reducing effect.

SUMMARY OF THE INVENTION

In view of above-mentioned state of the art as mentioned above, it is an object of the present invention to provide a friction reducing coating for engineering works which ① can be applied to substrates to be buried underground in a simple and easy manner, ② gives a friction reducing coating film for engineering work that will not wholly peel off from the substrates in laying the substrates underground by the soil adhesion-preventing construction method or negative friction cut construction method, caisson construction method or pipe jacking construction method without being affected by the method of laying (although the swollen layer occurring partly on the surface may be peeled off in the step of laying while performing the function of the friction reducing coating for engineering works), ③ when used for preventing the adhesion between the substrate surface and ground (soil), reduces the adhesiveness between temporary work steel materials and the surrounding ground in the step of extracting the steel materials and thus allows almost no soil adhesion to the temporary work steel materials during and after extraction without markedly producing such adverse effects as pulling up the surrounding ground, with the result that the space after extraction of the temporary work steel materials can be minimized (the volume of the space being almost the same as the volume of the temporary work steel materials themselves), hence the amounts of the necessary agent(s), earth and sand required for post-treatment (back-filling) can be minimized and ④ when used for reducing the friction between the substrate surface and ground (soil), allows the coating film surface to swell by absorbing the water given in advance or absorbed from the ground after driving into the ground or during the caisson construction method or pipe jacking construction method and thus can provide the swollen (friction reducing agent) layer to the interface between the substrate and soil in a sustained manner and can cope with soils of differing nature when the sustained release and other properties are modified according to the hydrophilicity of the binder resin, the coating film thickness and so on.

Another object of the invention is to provide a soil adhesion-preventing sheet pile or steel tubular pipe wherein the above-mentioned friction reducing coating for engineering works applied thereto in advance, and, a soil adhesion-preventing construction method which comprises using the above-mentioned friction reducing coating for engineering works and/or the above-mentioned soil adhesion-preventing sheet pile or steel tubular pipe and further provide a negative friction cut construction method for foundation structures which comprises using the above friction reducing coating for engineering works and thus can cut the friction between a foundation structure after laying underground and the surrounding ground and reduce the influences of changes in the surrounding ground on the foundation structure as well as a caisson or pipe jacking construction method which comprises using the above friction reducing coating for engineering works and can reduce the friction between the substrate and soil while minimizing the influences on the surrounding ground and thus can markedly improve the speed and efficiency of construction work.

To solve the above-mentioned prior art problems, the present inventors studied intensively in search of a soil adhesion-preventing construction method which prevents adhesion between substrate surface and ground (soil) and a friction reducing coating for engineering works which will well adhere to substrates and can provide a friction reducing layer in a sustained manner over a necessary period (in the case of caisson or pipe jacking construction method, during working, namely during laying or burying or, in the case of negative friction cut construction method, over a long period after laying) or, in other words, can maintain the friction reducing effect continuously, without being wholly peeled off in a short period of time.

As a result, they found that the above problems can be solved by applying a friction reducing coating for engineering works comprising a water-absorbing resin (a), a hydrophilic binder resin (b) which has an acid value of 40 mg KOH/g to 500 mg KOH/g and a solvent (c) as essential components in advance on the substrate in accordance with a specific formulation. Such and other findings have now led to completion of the present invention.

By employing the above constitution, it is now possible to provide a friction reducing coating for engineering works which can be used by applying to various substrates and the like in various methods of construction work, for example by applying in advance to temporary work steel materials to be buried in the ground to thereby produce the soil adhesion preventing effect, by which the adhesion between the substrate surface and ground (soil) is prevented, and/or produce a sustained friction reducing effect in the step of laying as well as after laying or, in other words, produce a lasting friction reducing effect. Further, a soil adhesion-preventing sheet pile or steel tubular pipe wherein the friction reducing coating for engineering works has been applied thereto in advance as well as a construction method for various substrates in which the above friction reducing coating for engineering works is used can be provided. The above-mentioned construction method is concretely a method of laying or burying and concrete examples thereof are the soil adhesion-preventing construction method for temporary work steel materials and the like and the negative friction cut construction method for underground structures. The above friction reducing coating for engineering works can also be adapted to the caisson construction method or pipe jacking construction method.

Thus, the present invention provides a friction reducing coating for engineering works comprising a water-absorbing resin (a), a hydrophilic binder resin (b) and a solvent (c) as essential components, wherein said hydrophilic binder resin (b) has an acid value of 40 mg KOH/g to 500 mg KOH/g.

The invention also provides a soil adhesion-preventing sheet pile or steel tubular pipe wherein the above friction reducing coating for engineering works has been applied thereto.

The invention further provides a soil adhesion-preventing construction method for the prevention of ground (soil) adhesion to a substrate surface which comprises utilizing the above friction reducing coating for engineering works and/or the above soil adhesion-preventing sheet pile and/or steel tubular pipe.

The invention finally provides a negative friction cut construction method, caisson construction method or pipe jacking construction method which comprises utilizing the above friction reducing coating for engineering works.

BRIEF DESCRIPTION OF THE DRAWINGS

The file of this patent contains at least one drawing executed in color. Copies of this patent with color drawings are provided to the Patent and Trademark Office with payment of the necessary fee.

DETAILED DESCRIPTION OF THE INVENTION

Figure 1:
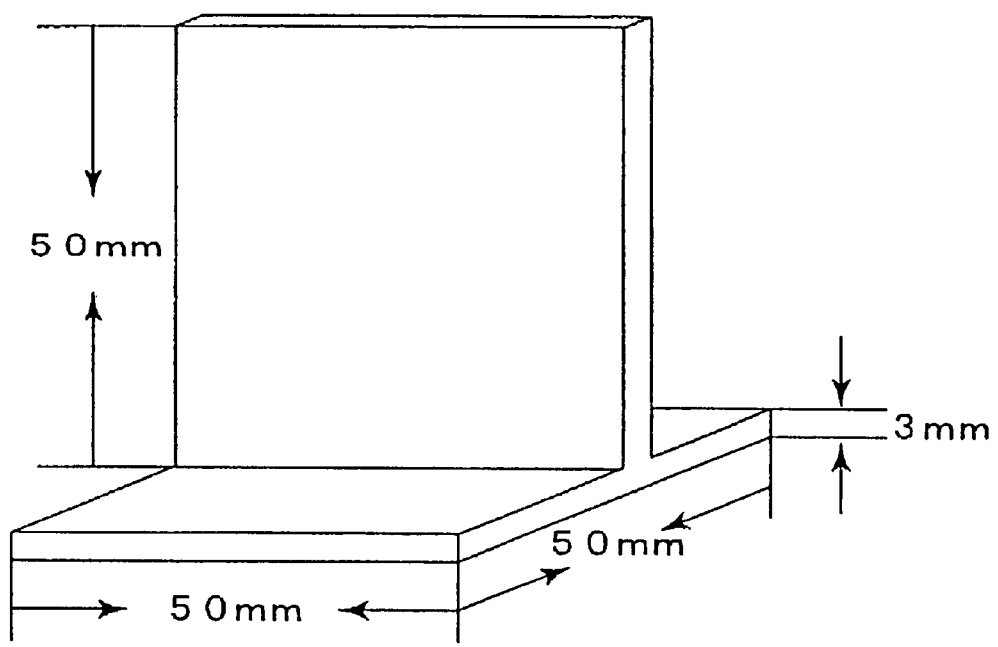
FIG. 1 is a schematic representation of a tool for tensile testing which is used in measuring the adhesion (X) of the coating of the invention to a substrate.

In the following, the present invention is described in detail.

The friction reducing coating for engineering works of the present invention, when applied to the substrate surface, forms a friction reducing coating film for engineering works and thus produces, among others, the effects (1) and (2) mentioned below.

Thus, (1) the friction reducing coating for engineering works according to the present invention can be used as a soil adhesion-preventing agent for preventing the adhesion between the substrate surface and ground (soil) or as a friction reducing agent for reducing the friction between the substrate surface and ground (soil), for instance, and when a substrate is buried in the ground, the substrate surface and the film formed by the friction reducing coating for engineering works are in close contact with each other and the film is prevented from being peeled off during driving and, when the substrate is allowed to stand in the ground, a lubricating gel layer is formed as a result of absorption of water in the ground (soil) and, in the step of substrate extraction or ground movement, the lubricating gel layer functions as a lubricant and peels off from the substrate surface and remains in the ground, whereby the frictional force between the substrate surface and ground (soil) is reduced and the soil adhesion can be prevented.

(2) Since the friction reducing coating for engineering works, which is to form a friction reducing coating film for engineering works, comprises the water-absorbing resin (a), hydrophilic binder resin (b) and solvent (c) as essential components, the water-absorbing resin (a) absorbs water in the ground (soil) and swells and the hydrophilic binder resin (b) performs its function as a binder, whereby the soil adhesion-preventing function and/or friction reducing function is performed more reliably. By using a solvent and rendering the friction reducing coating for engineering works substantially water-free so that troubles otherwise resulting from water absorption by and swelling of the water-absorbing resin (a) in the friction reducing coating for engineering works may not occur, it becomes possible to apply the coating uniformly since the water-absorbing resin (a) will not absorb water or swell in the step of application, even by spraying or the like technique owing to the resulting low viscosity, hence the application procedure becomes easy.

The friction reducing coating for engineering works according to the invention is intended for use in construction methods used in foundation works, among others, in the field of construction and engineering works for the purpose of preventing the adhesion between the substrate surface and ground (soil) or reducing the friction between the substrate surface and ground (soil).

The construction method for which the friction reducing coating for engineering works according to the invention is used, namely the construction method for which substrates having a friction reducing coating film for engineering works formed thereon from the friction reducing coating for engineering works according to the present invention, is not particularly restricted but may be any method in use in foundation work or the like in the field of construction and engineering works. In those methods used in ordinary foundation work or the like in the field of construction or engineering works, for instance, the substrate and/or ground (soil) moves during work or during use of the substrate. As the method involving the movement of the substrate during work, there may be mentioned, for example, the soil adhesion-preventing construction method, caisson construction method, pipe jacking construction method, benoto casing construction method, and the like. As the method involving the movement of the ground (soil) during work, there may be mentioned the negative friction cut construction method. The friction reducing coating for engineering works according to the present invention, when preferably used in these construction methods, produces such effects as prevents the adhesion between the substrate surface and ground (soil) and reduces the friction between the substrate surface and ground (soil) and the like, and thereby curtails the cost of foundation work or the like and enables rapid completion of the work.

First, the friction reducing coating for engineering works according to the present invention is described in detail in the following.

The water-absorbing resin (a) to be used in the practice of the invention is not particularly restricted but may be any of those resins which absorb water and thus swell and show an absorbency of not less than 3 times the original weight for deionized water (25° C., 1 hour). However, synthetic water-absorbing resins produced by crosslinking water-soluble or hydrophilic compounds (monomers and/or polymers) with a crosslinking agent, such as mentioned below by way of example, are preferred to natural water-swellable substances (gelatin, agar, etc.) since they are better balanced and, further, more readily adjusted for balancing among swelling capacity, water-soluble fraction, water-absorbing rate, strength and the like than the natural water-swellable substances (gelatin, agar, etc.).

The above-mentioned water-absorbing resin (a) specifically includes, among others, crosslinked poly(meth)acrylic acid, crosslinked poly(meth)acrylic acid salts, crosslinked sulfo-containing poly(meth)acrylic acid esters, crosslinked polyoxyalkylene-containing poly(meth)acrylic acid esters, crosslinked poly(meth)acrylamide, crosslinked (meth) acrylic acid salt-(meth)acrylamide copolymers, crosslinked hydroxyalkyl (meth)acrylate-(meth)acrylic acid salt copolymers, crosslinked polydioxolane, crosslinked polyethylene oxide, crosslinked polyvinylpyrrolidone, crosslinked sulfonated polystyrene, crosslinked polyvinylpyridine, starch-poly(meth)acrylonitrile graft copolymer hydrolyzates, crosslinked starch-poly(meth) acrylic acid (salt) graft copolymers, polyvinyl alcohol-maleic anhydride (salt) reaction products, crosslinked polyvinyl alcohol sulfonic acid salts, polyvinyl alcohol-acrylic acid graft copolymers, polyisobutylene maleic acid (salt) crosslinked polymers, and the like. These water-absorbing resins may be used singly or two or more of them may be used in combination.

The water-absorbing resin (a) to be used in the practice of the invention is preferably a salt-resistant one. The reason why a salt-resistant water-absorbing resin is preferred is that such a resin is relatively high in absorbency for hard water containing polyvalent metals and, when used in a friction reducing coating for engineering works, it is not much affected by the quality of water in the soil but can swell enough to exhibit sufficient friction reducing performance.

The salt-resistant water-absorbing resin to be used in the practice of the invention is not particularly restricted but may be any of those which show an absorbency of not less than 10 times for artificial seawater (25° C., 24 hours). Among the above-exemplified water-absorbing resins (a), however, those having a nonionic and/or sulfonic acid (salt) group are more preferred and those having an amide or hydroxyalkyl group or a pyrrolidone ring are more preferred. As such salt-resistant water-absorbing resin, there may be mentioned, among others, crosslinked copolymers of a (meth)acrylic acid salt and (meth)acrylamide, crosslinked copolymers of a hydroxyalkyl (meth)acrylate and a (meth) acrylic acid salt, and crosslinked polyvinylpyrrolidone. Further, polyoxyalkylene group-containing ones and crosslinked polyvinylpyrrolidone are particularly preferred. As such water-absorbing resins (a), there may be mentioned, among others, crosslinked copolymers of a methoxypolyoxyalkylene group-containing (meth)acrylate ester and a (meth)acrylic acid salt and crosslinked polyvinylpyrrolidone.

When such a salt-resistant water-absorbing resin is used as said water-absorbing resin, it swells to an expected extent irrespective of the quality of water in the soil (soft water, hard water, etc.), whereby satisfactory friction reducing performance can be exhibited with more certainty.

The method of preparing the water-absorbing resin(a) to be used in the practice of the invention is not particularly restricted but may comprise, for example, polymerizing a monomer composition comprising an ethylenically unsaturated monomer having solubility in water, if necessary together with a crosslinking agent. The water-absorbing resin (a), when produced by (co)polymerizing such an ethylenically unsaturated monomer, is higher in water absorbency and generally inexpensive. The above crosslinking agent is not particularly restricted.

The above-mentioned ethylenically unsaturated monomer specifically includes, but is not particularly limited to, acrylic acid, methacrylic acid, itaconic acid, maleic acid, fumaric acid, crotonic acid, citraconic acid, vinylsulfonic acid, (meth)allylsulfonic acid, 2-(meth)acrylamide-2-methylpropanesulfonic acid, 2-(meth)acryloylethanesulfonic acid, 2-(meth)acryloylpropanesulfonic acid as well as alkali metal salts and ammonium salts thereof; N,N-dimethylaminoethyl (meth)acrylate and quaternization products derived therefrom; (meth)acrylamides such as (meth)acrylamide, N,N-dimethyl(meth)acrylamide, 2-hydroxyethyl(meth) acrylamide, diacetone (meth)acrylamide, N-isopropyl(meth) acrylamide and (meth)acryloylmorpholine as well as derivatives of these monomers; hydroxyalkyl (meth) acrylates such as 2-hydroxyethyl (meth)acrylate and 2-hydroxypropyl (meth)acrylate; polyalkylene glycol mono (meth)acrylates such as polyethylene glycol mono(meth) acrylate, polypropylene glycol mono(meth)acrylate, methoxypolyethylene glycol mono(meth)acrylate and methoxypolypropylene glycol mono(meth)acrylate; N-vinyl monomers such as N-vinyl-2-pyrrolidone and N-vinylsuccinimide; N-vinylamide monomers such as N-vinylformamide, N-vinyl-N-methylformamide, N-vinylacetamide and N-vinyl-N-methylacetamide; vinyl methyl ether; and so forth. These ethylenically unsaturated monomers may be used singly or two or more of them may be used in combination.

Among the ethylenically unsaturated monomers specifically mentioned above, those ethylenically unsaturated monomers which have a nonionic group and/or a sulfonic acid (salt) group are more preferred, since these are highly resistant to salts. As such monomers, there may be mentioned, for example, 2-(meth)acrylamido-2-methylpropanesulfonic acid, 2-(meth)acryloylethanesulfonic acid, 2-(meth)acryloylpropanesulfonic acid, (meth)acrylamide, hydroxyalkyl (meth)acrylate, methoxypolyethylene glycol mono(meth)acrylate, N-vinyl-2-pyrrolidone and the like. Polyoxyalkylene group-containing ethylenically unsaturated monomers and N-vinyl-2-pyrrolidone are particularly preferred.

More preferred combinations in using a combination of two or more ethylenically unsaturated monomers as monomer components include, but are not particularly limited to, the combination of a (meth)acrylic acid alkaline metal salt, such as sodium acrylate, and acrylamide, and the combination of a (meth)acrylic acid alkaline metal salt and methoxypolyethylene glycol mono(meth)acrylate, for instance.

The water-absorbing resin (a) can be obtained by polymerizing the above monomer components.

The average molecular weight, shape or form, mean particle size and like factors of the water-absorbing resin (a) may be selected according to the composition of the friction reducing coating for engineering works, the binder species, the physical properties thereof, the working environment and so forth. The mean particle size of the water-absorbing resin (a) is, however, preferably 30 to 800 μm, more preferably 30 to 600 μm, most preferably 30 to 400 μm.

If the mean particle size of the water-absorbing resin (a) to be used in the practice of the invention is above 800 μm, the particle size is excessively large and the particles of the water-absorbing resin (a) unfavorably shows a tendency toward sedimentation upon admixing of the water-absorbing resin (a) with a solution of the hydrophilic binder resin (b) in the solvent (c).

If, on the other hand, the water-absorbing resin (a) has a mean particle size less than 30 μm, the resin unfavorably becomes very difficult to handle (e.g. it scatters like a fine powder).

Now, the hydrophilic binder resin (b), which is a constituent of the friction reducing coating for engineering works of the present invention, is described.

The hydrophilic binder resin (b) to be used in accordance with the invention is not particularly restricted but may be any of those having an acid value of 40 mg KOH/g to 500 mg KOH/g for the resin to have an appropriate level of hydrophilicity and capable of functioning as a binder for fixing the water-absorbing resin (a) to the substrate surface. Thus, the hydrophilic binder resin (b) to be used in the practice of the present invention may be any of those which ① are soluble or swellable in water, ② can function as a binder for fixing the water-absorbing resin (a) onto the substrate surface and are soluble in the solvent (c), without any other particular restrictions and thus includes, among others, (meth)acrylate ester copolymers, polyurethanes, polyesters, polycarbonates, polyvinyl alcohol-based resins, partially hydrolyzed polyvinyl acetate, ethylene-polyvinyl alcohol copolymers and the like. One of them or a mixture of two or more of them may be used.

If the above hydrophilic binder resin (b) is too low in hydrophilicity, it will inhibit the swelling of the water-absorbing resin (a), namely decrease the soil water absorption by the resin (a) and inhibit the same from swelling to a sufficient extent, hence the soil adhesion-preventing performance of the friction reducing coating for engineering works will unfavorably decrease. If, conversely, the hydrophilic binder resin (b) has an excessively high level of hydrophilicity, it is unfavorable because the adhesion of the binder to the substrate on the occasion of absorption of water in the soil will become excessively low, allowing the whole coating film to readily peel off. For such reasons as mentioned above, the hydrophilic binder resin (b) should preferably have an appropriate level of hydrophilicity.

If the acid value of the above hydrophilic binder resin (b) is less than 40 mg KOH/g, the hydrophilicity of the hydrophilic binder resin (b) is too low and the swelling of the water-absorbing resin on the occasion of absorption of water will be restricted accordingly, hence any satisfactory friction reducing effect cannot be produced. If the acid value exceeds 500 mg KOH/g, the hydrophilicity of the hydrophilic binder resin (b) becomes excessively high, so that the adhesiveness of the coating film becomes insufficient on the occasion of water absorption and, as a result, the friction reducing coating film for engineering works may readily be peeled off wholly, hence no satisfactory soil adhesion-preventing effect or friction reducing effect can be produced or the friction reducing effect cannot be maintained or such function as sustained release cannot be performed.

For the above hydrophilic binder resin (b) to have an adequate level of hydrophilicity, the acid value of the hydrophilic binder resin (b) is preferably not less than 50 mg KOH/g, more preferably not less than 70 mg KOH/g. For the binder function on the occasion of water absorption to be maintained, the acid value of the hydrophilic binder resin (b) is preferably not more than 300 mg KOH/g, more preferably not more than 200 mg KOH/g.

The glass transition temperature of the above hydrophilic binder resin (b) is not particularly restricted but, from the viewpoint of balancing between the adhesiveness to the substrate surface and the toughness of the film formed by the friction reducing coating for engineering works in the step of burying the substrate into the ground, the resin (b) preferably has a glass transition temperature(s) in the range of -20° C. to 120° C. If the glass transition temperature is below -20° C., the friction reducing coating film for engineering works will become sticky and may cause blocking particularly when substrates after application of the coating are piled up and allowed to stand in that state. In addition, the strength of the friction reducing coating film for engineering works will unfavorably become insufficient, hence the coating film may readily be peeled off in the step of burying the substrate in the ground. For that reason, the glass transition temperature is more preferably not lower than 0° C.

If, on the other hand, the glass transition temperature of the hydrophilic binder resin (b) is above 120° C., the adhesion-preventing agent layer will become excessively hard, hence the adhesion to the substrate and the flexibility of the friction reducing coating film for engineering works will become insufficient, with the result that the peeling of the coating film and the dropping of the water-absorbing resin (a) will also readily occur unfavorably in the step of burying the substrate in the ground. Therefore, a glass transition temperature not higher than 100° C. is more preferred and it is further preferred that the resin (b) have a glass transition temperature between 0° C. and 20° C. and a glass transition temperature between 20° C. and 100° C., since, in such a case, the softening component and the shape-retaining component can be better balanced.

The weight average molecular weight (Mw) of the above hydrophilic binder resin (b) is not particularly restricted but preferably is within the range of 30,000 to 300,000, more preferably within the range of 50,000 to 200,000. When the resin to be used has such a weight average molecular weight as mentioned above, the toughness of the adhesion-preventing agent and the solubility thereof in alkaline water can be balanced with ease.

The hydrophilic binder resin (b) to be used is preferably soluble in alkaline water (alkaline water-soluble binder resin) since the hydrophilicity thereof can be readily adjusted by adjusting the acid value, for instance.

In the following, the alkaline water-soluble binder resin to be used in the practice of the invention is described.

The alkaline water-soluble resin, which is a preferred example of the hydrophilic binder resin (b) constituting the friction reducing coating for engineering works of the invention, is soluble in a 0.4% (by weight) aqueous solution of NaOH but insoluble in neutral or acidic water but swelling in neutral water. The alkaline water-soluble resin is not particularly restricted but may be any of those having the solubility features defined above. Thus, there may be mentioned, for example, copolymers of an α,β-unsaturated carboxylic acid monomer and another monomer copolymerizable therewith.

As for the above-mentioned solubility in alkaline water, the degree of solubility is not particularly restricted but the term indicates a preferred degree of dissolution of the alkaline water-soluble binder resin to be used as a preferred binder resin in the practice of the present invention, as described later herein. The term "alkaline water-soluble resin (alkaline water-soluble binder resin)" is interchangeable with another term "alkali-soluble resin". However, the term "alkaline water-soluble resin" is more definite and precise, hence the term "alkaline water-soluble resin" is employed in the present specification.

The solubility of the alkaline water-soluble binder resin that is preferably used in the practice of the invention in alkaline water is not particularly restricted unless the features of the invention are impaired.

For example, the above solubility can be defined as a percent weight loss of the alkaline water-soluble resin in such a solubility test as mentioned below. The solubility of the alkaline water-soluble binder resin, which can preferably be used in the practice of the invention, in alkaline water can be determined, for example, by putting 10 grams of moldings (e.g. cylindrical pellets, 3 mm in diameter and 3 mm in length, obtainable, for example, by using a twin-screw extruder, or pieces of other moldings than pellets as obtained by cutting to a size of not larger than 5 mm) of the alkaline water-soluble binder resin to be tested into 500 g of a 0.4% (by weight) aqueous solution of NaOH and, after 24 hours of stirring at 25° C., determining the percent loss in weight of the alkaline water-soluble binder resin in the alkaline water.

That is, if there is any fraction of the resin remaining undissolved after 24 hours of stirring, the fraction is collected by filtration or the like, washed with water and, after drying, weighed. The weight loss can be determined from the weight of the alkaline water-soluble binder resin before solubility testing and that after testing, namely in terms of percent by weight, namely (initial weight−weight after solubility testing)/(initial weight)×100.

As far as the alkaline water-soluble binder resin to be used in the practice of the invention is concerned, this value is preferably 50 to 100% by weight, more preferably 60 to 100% by weight, still more preferably 70 to 100% by weight.

The method of producing the hydrophilic binder resin (b) to be used in the practice of the invention is not particularly restricted but those copolymers which can be obtained by polymerizing an unsaturated monomer composition comprising an α,β-unsaturated carboxylic acid monomer and some other monomers copolymerizable therewith are preferred.

The α,β-unsaturated carboxylic acid monomer to be used in the production of the hydrophilic binder resin (b) to be used according to the invention, for instance, includes, among others, α,β-unsaturated carboxylic acids such as acrylic acid, methacrylic acid, maleic acid, itaconic acid and fumaric acid; α,β-unsaturated carboxylic acid anhydrides such as maleic anhydride and itaconic anhydride; α,β-unsaturated dicarboxylic acid monoesters such as maleic acid monoesters, fumaric acid monoesters and itaconic acid monoesters; and the like. The above α,β-unsaturated carboxylic acid monomer may be used singly or two or more of them may be used. Among them, acrylic acid and/or methacrylic acid, which is an acrylic α,β-unsaturated carboxylic acid, is inexpensive and is highly copolymerizable with other unsaturated monomers, hence is preferably used.

As the other monomer copolymerizable with the above α,β-unsaturated carboxylic acid monomer, there may be mentioned, for example, esters of a mono alcohol containing 1 to 18 carbon atoms with (meth)acrylic acid, such as methyl acrylate, ethyl acrylate, propyl acrylate, butyl acrylate, stearyl acrylate, methyl methacrylate, ethyl methacrylate, propyl methacrylate, butyl methacrylate and stearyl methacrylate; nitrile group-containing vinyl monomers such as acrylonitrile and methacrylonitrile; amido group-containing vinyl monomers such as acrylamide and methacrylamide; hydroxyl-containing vinyl monomers such as hydroxyethyl acrylate and hydroxypropyl methacrylate; epoxy-containing vinyl monomers such as glycidyl methacrylate; α,β-unsaturated carboxylic acid metal salts such as zinc acrylate and zinc methacrylate; aromatic vinyl monomers such as styrene and α-methylstyrene; aliphatic vinyl monomers such as vinyl acetate; halogen-containing vinyl monomers such as vinyl chloride, vinyl bromide, vinyl iodide and vinylidene chloride; allyl ethers; maleic acid derivatives such as maleic acid dialkyl esters; fumaric acid derivatives such as fumaric acid dialkyl esters; maleimide and maleimide derivatives such as N-methylmaleimide, N-stearylmaleimide, N-phenylmaleimide and N-cyclohexylmaleimide; itaconic acid derivatives such as itaconic acid mono- and dialkyl esters, itaconamides, itaconimides and itaconic acid amide esters; alkenes such as ethylene and propylene; dienes such as butadiene and isoprene; vinyl ethers; sulfonic acid (salt) group-containing unsaturated monomers such as 2-(meth)acryloylpropane sulfonic acid (salts) and 3-allyloxy-2-hydroxypropanesulfonic acid (salts); polyalkylene glycol (meth)acrylates and the like. One or two or more of these may be used.

Among them, alkyl (meth)acrylates are preferred since such esters having various properties are readily available and the Tg (hardness, softness) and the adhesion to the substrate, among others, of the binder resin can be readily adjusted by appropriately combining them and since they show relatively good copolymerizability with α,β-unsaturated carboxylic acid monomers.

The alkyl (meth)acrylate is used preferably in an amount of 30 to 100% by weight, more preferably 50 to 100% by weight, still more preferably 60 to 100% by weight, still further preferably 70 to 100% by weight, based on the sum (taken as 100% by weight) of the other monomers copolymerizable with the α,β-unsaturated carboxylic acid therewith. Thus, the use of acrylic monomers as other monomers constitutes a preferred mode of embodiment of the alkaline water-soluble resin as the hydrophilic binder resin (b) to be used in the practice of the invention.

The proportions of the above α,β-unsaturated carboxylic acid monomer and the unsaturated monomer component comprising the other monomers copolymerizable therewith are not particularly restricted but, for example, the proportion of the α,β-unsaturated carboxylic acid monomer in the whole monomer composition is preferably 7 to 80% by weight, more preferably 7 to 50% by weight, still more preferably 9 to 30% by weight, based on the whole unsaturated monomer composition (taken as 100% by weight) composed of the α,β-unsaturated carboxylic acid monomer and other monomers copolymerizable therewith.

If the proportion of the α,β-unsaturated carboxylic acid monomer in the whole monomer composition constituting the above hydrophilic binder resin (b) is less than 7% by weight, a low acid value will result, hence the hydrophilicity will be too low. If the proportion exceeds 80% by weight, the hydrophilicity will become too high, tending to cause problems.

The monomer(s) other than the α,β-unsaturated carboxylic acid monomer but copolymerizable therewith which is(are) to be used as a starting material(s) in the production of the binder resin by polymerizing the above unsaturated monomer composition in a preferred embodiment of the hydrophilic binder resin (b) of the present invention is used preferably in a proportion of 93 to 20% by weight, more preferably 93 to 50% by weight, still further preferably 91 to 70% by weight, based on the whole unsaturated monomer composition (taken as 100% by weight) composed of the α,β-unsaturated carboxylic acid monomer and other monomers copolymerizable therewith.

If the proportion of the monomers other than the α,β-unsaturated carboxylic acid monomer but copolymerizable therewith is less than 20% by weight, the hydrophilicity will become excessively high whereas if it exceeds 93% by weight, the hydrophilicity will become too low. Both the cases are unfavorable.

The method of producing the above-mentioned hydrophilic binder resin (b) is not particularly restricted but any of the ordinary polymerization methods known in the art, such as solution polymerization, bulk polymerization, emulsion polymerization and suspension polymerization can be utilized. Among them, the production thereof by solution polymerization in an organic solvent is preferred, however.

This is because the friction reducing coating for engineering works of the invention can be produced by mixing a water-absorbing resin directly into the solution or dispersion of hydrophilic binder resin (b) obtained by solution polymerization.

As for the mode of polymerization, there may be mentioned radical polymerization, anionic polymerization, cationic polymerization and coordination polymerization, among others, and radical polymerization is preferred as a commercial method of production.

As the polymerization vessel to be used for raw polymer production, there may be mentioned not only a vessel type reactor but also a tubular reactor such as a kneader or static mixer, for instance. If necessary, these rectors may be used in combination. A dropping tank may also be used if necessary. The pressure in the reaction vessel may be at a reduced, ordinary or pressurized level.

The radical polymerization initiator to be used in the radical polymerization is not particularly restricted but includes, among others, azo initiators such as 2,2'-azobisisobutyronitrile and 2,2'-azobis(2,4-dimethylvaleronitrile); and peroxide initiators such as benzoyl peroxide and di-tert-butyl peroxide. Two or more of these radical polymerization initiators may be used in combination.

The solvent to be used in the above solution polymerization is not particularly restricted but may be any of those solvents which do not adversely affect the radical polymerization reaction. Thus, mention may be made of alcohols such as methanol, ethanol and isopropyl alcohol; aromatic hydrocarbons such as benzene and toluene; ketones such as acetone and methyl ethyl ketone; aliphatic esters such as ethyl acetate and butyl acetate; ethylene glycol and derivatives thereof such as ethylene glycol monomethyl ether; propylene glycol derivatives such as propylene glycol monomethyl ether and propylene glycol monomethyl ether acetate; and the like. Two or more of these solvents may be used in combination.

Now, mention is made of the solvent (c) to be used in the practice of the invention.

The solvent (c) may be any of those known in the art and used in conventional coating, without any particular restriction. Thus, for example, one or a combination of two or more of the solvents specifically mentioned hereinabove referring to the method of producing the hydrophilic binder resin (b) can be used.

As for the selection of the solvent (c), a solvent having a boiling point suited for application to the substrate together with safety is preferably selected. By selecting a solvent having a low boiling point, it becomes possible to achieve quick drying, coating film formation in a short period of time, hence easy thick coating. When a solvent having a high boiling point is selected, the working time can be prolonged. By using an organic solvent as the medium, it becomes easy to apply the coating since the swelling of the water-absorbing resin by absorption of water when a water-containing medium is used can be avoided and no gel formation occurs. When a highly volatile solvent such as methyl ethyl ketone or methanol is used, drying can be completed in about 10 minutes, namely very rapidly as compared with the use of water as the medium, and the next work or step can be started swiftly, hence the period of construction or the time for application to the substrate can be markedly curtailed.

If the friction reducing coating for engineering works of the invention contains, as essential components, the water-absorbing resin (a), hydrophilic binder resin (b) and solvent (c) specifically mentioned hereinabove, it may contain another additive or other additives (h), such as another resin, a pigment, one or more of various stabilizers and/or fillers, and so forth unless the characteristic features thereof are impaired.

The proportions of the water-absorbing resin (a), hydrophilic binder resin (b) and solvent (c) and another additive or other additives (h) are not particularly restricted but, for attaining the characteristic features of the friction reducing coating for engineering works of the invention most satisfactorily, the weight ratio of the sum of the water-absorbing resin (a), hydrophilic binder (b) and solvent (c) to the whole composition, namely $\{[(a)+(b)+(c)]/[(a)+(b)+(c)+(h)]\}\times 100$, is preferably not less than 50% by weight, more preferably not less than 70% by weight, most preferably not less than 80% by weight.

While the proportions of the water-absorbing resin (a), hydrophilic binder (b) and solvent (c) and another additive or other additives (h) are not particularly restricted, it is preferred for attaining the characteristic features of the friction reducing coating for engineering works of the invention satisfactorily that the water-absorbing resin (a) amount to 5 to 60% by weight, the hydrophilic binder (b) to 10 to 70% by weight, the solvent (c) to 5 to 70% by weight and the other additives (h) to 0 to 50% by weight and it is more preferred that the water-absorbing resin (a) amount to 10 to 50% by weight, the hydrophilic binder (b) to 10 to 60% by weight, the solvent (c) to 10 to 60% by weight and the other additives (h) to 0 to 30% by weight.

The friction reducing coating for engineering works according to the invention, when applied to the substrate surface, forms a friction reducing coating film for engineering works and thereby produces the effects thereof. To apply to the substrate surface means (1) the formation of a friction reducing coating film for engineering works on the substrate surface by applying thereto the friction reducing coating for engineering works according to the invention, (2) attaching a sheet having a friction reducing coating film for engineering works as formed by applying thereto the friction reducing coating for engineering works according to the invention to the substrate surface so that the film side of the sheet may face the outside or (3) attaching a film form of the friction reducing coating for engineering works according to the invention to the substrate surface, for instance.

The method of applying the friction reducing coating for engineering works according to the invention is not particularly restricted but may be any of those methods of coating application which are in general use. Typically, the coating may be applied by using a brush, a roller or the like, or may be applied by spraying using a sprayer, such as a lithin gun or the like. The coating is generally applied to the substrate or sheet surface at the site corresponding to the portion (site) in which the adhesion between the substrate surface and ground (soil) is to be prevented or to the portion (site) in which the friction between the substrate surface and ground (soil) is to be reduced. The coating may also be applied to other portions or sites, however. The spread or coating weight (after drying) is not particularly restricted but is preferably within the range of 100 to 2,000 $g/m^2$, for instance. If the spread is less than 100 $g/m^2$, the effects of the invention may not be fully produced while at a spread level exceeding 2,000 $g/m^2$, the time from application to drying becomes long, which may lead to an economic disadvantage. A more preferred level is within the range of 200 to 1,500 $g/m^2$ and a more preferred range is 200 to 1,000 $g/m^2$. The substrate surface may have been subjected to any other surface treatment or have an undercoat or the like. The thickness to which the friction reducing coating for engineering works according to the invention is to be applied to various substrates is not particularly restricted but is preferably 50 to 2,000 µm, more preferably 100 to 1,000 µm.

In cases that the friction reducing coating for engineering works of the invention is applied to a sheet and said sheet is adhered to the substrate surface, the sheet may be made of a cloth, paper, plastic film, etc. It is also possible to make the coating itself into a sheet by drying the coating without using any substrate and use the sheet. In this case, adhesive agent is preferably applied to the reverse side of the sheet since this facilitates the sticking to the substrate surface. The adhesive agent is not particularly restricted, and for example, an acrylic adhesive agent or the like in general use may be used.

Considering the applicability in applying to substrates complicated in shape, the friction reducing coating for engineering works according to the invention is preferably applied to the substrates to form a film thereon. A film for bonding, for instance, require time in application to complicated shapes and the working efficiency on such occasion is not so good, hence such films are not very preferred.

In cases where the adhesion between the substrate surface and ground (soil) is to be prevented, for instance, the substrate to which the coating of the invention is to be applied is not particularly restricted but may be any of those substrates known in the art for use as temporary work steel materials to constitute a shoring wall or the like and to be extracted later. Thus, there may be mentioned, among others, sheet piles, steel tubular piles, corrugated sheets, H-steels, I-steels, steel pipe piles, iron poles and like piles or poles. In cases where the friction between the substrate surface and ground (soil) is to be reduced, the substrate is not particularly restricted but may be any of those base materials or substrates known in the art for use in underground structures or in the caisson construction method or pipe jacking construction method; for example, there may be mentioned steel pipes, Hume pipes and other pipes, sheet piles, steel tubular pipes, corrugated sheets, H-steels, I-steels, steel pipe piles, iron poles, concrete piles, poles and other piles as well as various tanks and water storage tanks used mainly in the caisson construction method.

It is preferably that the friction reducing coating for engineering works according to the invention forms a friction reducing agent layer to the surface of a substrate and the friction reducing agent layer is supplied with sustained-release between the substrate surface and ground (soil). Thus, as one of the important characteristics of the friction reducing coating for engineering works according to the invention, there may be mentioned the fact that the friction reducing agent layer can be provided in a sustained manner and, in a preferred form of the friction reducing coating for engineering works according to the invention, the friction reducing effect is lasting.

As for the mechanisms thereof, the water absorption by the friction reducing coating film for engineering works (friction reducing agent layer) proceeds gradually from around the surface and, therefore, the rate of water absorption can be selected at a desired level according to the respective work conditions by appropriately adjusting the hydrophilicity of the hydrophilic binder resin (b) and/or the proportions of the water-absorbing resin (a) and hydrophilic binder resin (b). Thus, the substrate surface can always be provided with a new friction reducing agent layer (swollen layer resulting from water absorption) from the friction reducing coating film for engineering works formed on the substrate surface over a long period, say for days, as a result of absorption of an appropriate amount of water in the ground.

A typical example of the sustained release is as follows.

The friction reducing coating for engineering works according to the invention is applied to a substrate 1 (e.g. steel pipe) and only a part around the surface of the resulting coating film is allowed to absorb water and swell to form a friction reducing layer 1 and, then, the substrate 1 (e.g. steel pipe 1) is driven into the ground (day 1). The friction reducing agent layer 1 functions as a friction reducing agent and peeled off from the surface of the substrate 1 (e.g. steel pipe 1).

However, until the next day of work, a part around the surface of the friction reducing coating for engineering works on the substrate surface absorbs water in the ground and swells and newly forms a friction reducing agent layer 2. When, on day 2, the substrate 1 (e.g. steel pipe 1) is further driven deeper into the ground by driving a substrate 2 (e.g. steel pipe 2) from on the ground into the ground in the same manner as on day 1, the friction reducing agent layer 2 functions as a friction reducing agent and is peeled off from the substrate 1 (e.g. steel pipe 1).

By repeating this phenomenon, even a substrate (e.g. steel pipe) used in the pipe jacking construction method or the like according to which it is driven into the ground repeatedly for a number of days, when once coated with the friction reducing coating for engineering works according to the invention on the ground, can perform the friction reducing function in the ground throughout the whole work period. The above is an example of the case in which a substrate or a base body is buried by driving or the like.

The friction reducing coating for engineering works according to the invention prepared by employing a specific composition is excellent in the sustained feature of the friction reducing effect. Namely, the coating is excellent in the lasting feature of the friction reducing effect and maintains the reducing effect on the friction between soil and a substrate, base body or foundation structure coated with the friction reducing coating for engineering works according to the invention for a long period even after burying or laying underground and, therefore, even if the ground or the like changes, the fluctuation or displacement of the substrate, base body or the like relative to the ground can be minimized owing to the above friction reducing effect.

As a result, the structure such as a building on the substrate, base body or foundation structure is stabilized. For example, even when the substrate, base body or foundation structure is laid in a hole in the ground by means of a crane or the like, the reducing effect on the friction between soil and the substrate, base body or the like can last. Thus, the work can preferably be carried out in the manner of negative friction cut construction method.

The friction reducing coating for engineering works according to the invention preferably shows a ratio (X/Y) between the adhesion or bond strength (X) of the friction reducing coating for engineering works to a steel material and the breaking strength (Y) of the friction reducing coating film for engineering works of not less than 0.5.

The friction reducing coating for engineering works according to the invention is applied, for example, to temporary work steel materials to be recovered later, for example sheet piles and, when the sheet piles are driven into the ground, the coating film on the sheet pile surface undergoes a great frictional force due to the friction with soil or matters buried in soil (e.g. stones, rubbles, etc.). Similarly, when various substrates are used in a method for reducing the friction between the substrate surface and ground (soil) and are driven into the ground, the coating film is exposed to a great frictional force. In addition, that friction is not uniform but portions of the coating film locally undergo particularly great frictional forces. If, on that occasion, a large area of the coating film is peeled off, the soil adhesion-preventing function and/or friction reducing function on the sites of peeling is extremely reduced.

Therefore, the friction reducing coating for engineering works according to the invention preferably is•high in the adhesiveness (dry state) to the substrate surface and•weak in film breaking strength so that, even when a portion of the coating film is peeled off, the surroundings may not be entrained.

In view of the conditions mentioned above, the friction reducing coating for engineering works according to the invention preferably has a ratio ((X)/(Y)) between adhesion (X) to substrate surface and coating film breaking strength (Y) of not less than 0.5, more preferably not less than 0.7, most preferably not less than 1.0.

If the above ratio (X)/(Y) is less than 0.5, the breaking strength (Y) of the film formed from the friction reducing coating for engineering works is high as compared with the adhesion (X) of that friction reducing coating film for engineering works to the substrate surface and, therefore, once peeling of the coating film has occurred, that peeling propagates through the friction reducing coating film for engineering works, tending to result in large area peeling, hence the soil adhesion-preventing function or the friction reducing function after peeling will markedly decrease, whereby troubles may readily be caused.

The magnitude of adhesion (X) in a dry state of the friction reducing coating film for engineering works is not particularly restricted but, if the adhesion (X) in dry state is too small, peeling readily occurs in the step of driving the substrate into the ground. The adhesion (X) is thus preferably not less than 100 N/cm$^2$, more preferably not less than 300 N/cm$^2$.

Further, the friction reducing coating film for engineering works, after driving of a steel material for temporary work into the ground, for instance, absorbs water in the ground and swells, hence the adhesion thereof to the temporary work steel material lowers. And, when the temporary work steel material is extracted, the swollen friction reducing coating film for engineering works is peeled off from the steel material owing to the force of friction with the surrounding soil and the temporary work steel material can be recovered in an almost intact condition. Therefore, the friction reducing coating film for engineering works in a swollen state as a result of absorption of a sufficient amount of water preferably has an adhesion to the temporary work steel material of not more than 10 N/cm$^2$, more preferably not more than 5 N/cm$^2$, most preferably not more than 1 N/cm$^2$.

When the friction reducing coating for engineering works according to the invention is used, such effects as mentioned above are produced. The soil adhesion-preventing sheet pile or steel tubular pipe wherein the friction reducing coating for engineering works according to the invention has been applied thereto has a coating film formed by the friction reducing coating for engineering works according to the invention on the substrate sheet pile surface and is therefore effective in producing the effects of the invention and improving the work efficiency in various foundation works and the like. Such soil adhesion-preventing sheet pile or steel tubular pipe also constitutes an aspect of the present invention.

The soil adhesion-preventing construction method for the prevention of ground (soil) adhesion to a substrate surface which comprises utilizing the friction reducing coating for engineering works according to the invention and/or the soil adhesion-preventing sheet pile and/or steel tubular pipe according to the invention, or the negative friction cut construction method, caisson construction method or pipe jacking construction method which comprises utilizing the friction reducing coating for engineering works according to the invention is an effective method of improving the work efficiency of various foundation works and the like. Such soil adhesion-preventing construction method, negative friction cut construction method, caisson construction method or pipe jacking construction method also constitutes another aspect of the present invention.

As for the modes of laying or burying temporary work steel materials or other bodies to be buried when the adhesion between the substrate surface and ground (soil) is to be reduced by using the friction reducing coating for engineering works according to the invention, the base body steels or the like may be hanged on a crane or the like, then laid in a hole dug in the ground and buried, or a method comprising driving or pushing forward the base body, such as the caisson construction method or pipe jacking construction method, may be employed, for instance. In cases where the adhesion between the substrate surface and ground (soil) is to be reduced using the friction reducing coating for engineering works according to the invention, the thickness of the friction reducing coating film for engineering works formed on the substrate surface is judiciously adjusted according to the work conditions and so forth. For example, when the soil water content is low or the period for laying temporary work steel materials or the like is short, the coating film thickness is preferably reduced so that the adhesiveness to the substrate surface may be reduced even in the presence of a relatively small amount of water. By this, it becomes possible to facilitate the coating film to be peeled off upon being moistened after driving the substrate into the ground, hence it becomes possible to prevent the adhesion of soil to the substrate surface. When the soil water content is high or the period for laying temporary work steel materials or the like is long, the adhesion of soil to the substrate surface can be prevented by increasing the coating film thickness to thereby stabilize the feeding of a moistened gel layer during the period of laying or burying even in the presence of a relatively large amount of water. In this way, the soil adhesion-preventing function can be performed adequately according to the soil at each work site, the period of laying and other factors by adjusting the thickness of the friction reducing coating film for engineering works or adjusting the hydrophilicity or some other property of the water-absorbing resin (a) or hydrophilic binder resin (b).

For reducing the friction between the substrate surface and ground (soil) using the friction reducing coating for engineering works according to the invention, the coating is suited for use in the negative friction cut construction method, caisson construction method or pipe jacking construction method and can also be applied in carrying out the benoto casing construction method. Thus, even when the construction method comprising disposing pile casings in the ground, then disposing reinforcing bars therein and placing concrete therein while extracting the pile casings to thereby construct a ground foundation structure constituted of reinforced concrete is used, the extraction of pile casings can be facilitated and the influences of the earth pressure can be suppressed by forming a friction reducing coating film for engineering works on the outer sides of each pile casing. In this way, the present invention makes it possible to suppress the peeling of the friction reducing coating film for engineering works from the substrate surface and allow the coating film on the substrate surface to absorb water and swell to a sufficient extent in any of the laying or burying method and, thus, the effects of the present invention can be produced. Therefore, the frictional force between the substrate surface and ground (soil) can be reduced and the speed and efficiency of work can be markedly improved while minimizing the influences on the surrounding ground. After burying or laying in the ground, the coating film can cut the friction between the substrate surface of any of various underground foundation structures and the surrounding ground and suppress the influences of the possible surrounding ground fluctuations on the structures.

BEST MODES FOR CARRYING OUT THE INVENTION

The following examples illustrate the present invention more concretely. They are, however, by no means limitative of the scope of the present invention. The acid value of the hydrophilic binder resin (b) was determined by the method described in the relevant paragraph 4.3 of JIS K 6901 "Methods of testing liquid unsaturated polyester resins". In cases where the hydrophilic binder resin (b) was insoluble in the solvent prescribed in that test method, however, the value was determined by using a solvent in which that resin was soluble and otherwise following the procedure of that test method.

The phase transition temperatures of the hydrophilic binder resin (b) was determined according to "JIS K 7121: Method of determining phase transition temperatures of plastics" in a nitrogen atmosphere using a Seiko Denshi Kogyo model DSC 220 C apparatus. Test specimens were conditioned according to Paragraph 3. (3) of the above-cited JIS standard.

As for the solubility of the alkaline water-soluble resin according to the invention, the solubility of the alkaline water-soluble resin of the invention in alkaline water was determined in terms of weight loss, as mentioned below. Thus, for example, 10 grams of moldings, not larger than 5 mm in size, of the alkaline water-soluble resin to be tested (e.g. 3-mm pellets prepared in the examples or, if not palletized, pieces cut to a size of not larger than 5 mm) were placed in 500 grams of a 0.4% (by weight) aqueous solution of NaOH and, after 24 hours of stirring, the loss in weight of the moldings of the alkaline water-soluble resin as resulting from dissolution in the alkaline water was determined.

Thus, if there was a portion of the resin remaining undissolved after 24 hours of stirring, the residue was separated by filtration or the like and washed with water and, after drying, weighed. The percent weight loss was calculated based on the original weight of the alkaline water-soluble resin prior to solubility testing. Thus, it was calculated in terms of the percentage of the ratio<original weight−weight after solubility testing>/<original weight>. In cases where there was no residue remaining undissolved observed upon filtration, the result was reported as dissolution.

The adhesion (X) of the film made of the friction reducing coating for engineering works according to the invention to temporary work steel materials was measured as described below.

[1] The friction reducing coating of the invention was applied to substrates, 50 mm×50 mm in size, made of the same material as temporary work steel materials in advance to a desired thickness, followed by drying.
[2] Then, such a steel-made tool as shown in FIG. 1 was adhered to each of the steel material lower surface (with no friction reducing coating applied) and the steel material upper surface (the surface coated with the friction reducing coating, namely on the film made of the friction reducing coating for engineering works) using an adhesive (e.g. an epoxy-based adhesive (e.g. Araldite (product of Ciba Geigy)) (total of two tools) and maturation/cure was effected for a curing period suggested for the adhesive.
[3] The adhesion (peel strength) between the substrate and the friction reducing coating film was measured using a commercial tensile tester (25° C., rate of pulling: 10 mm/min).
[4] The mean value of all data (n=3 to 5) exclusive of the data for the sample(s) showing peeling at other sites than between the substrate and friction reducing coating film was reported as the adhesion (X).

The adhesion of the friction reducing coating film to temporary work steel materials in a wet condition was determined by immersing the substrates after coating and drying in the above step [1] in deionized water at 25° C. for 72 hours and then performing the procedure of the steps [2] to [4].

The breaking strength (Y) of the film made of the friction reducing coating for engineering works was determined by the method described below.

The breaking strength (Y) of the friction reducing coating film was measured by punching out JIS K 6301 No. 3 dumbbell specimens from a film made of the friction reducing coating for engineering works and testing them using a commercial tensile tester under the conditions: 25° C. and rate of pulling: 50 mm/min. The number (n) of specimens was 3 to 5 and the mean value of all data (breaking strength data) was reported as the breaking strength (Y).

PRODUCTION EXAMPLE 1

A water-absorbing resin was prepared in the following manner. Thus, a 1.5-liter jacketed desk kneader equipped with a thermometer and a blade (stirring blade) and lined with a trifluoroethylene resin on the inside surface was used as a reactor. The reactor was charged with 60.18 g of methoxypolyethylene glycol methacrylate (mol. wt. 512), 3.76 g of methacrylic acid (mol. wt. 86.09), 210.69 g of sodium methacrylate (mol. wt. 108), 1.3 g of polyethylene glycol diacrylate (as crosslinking agent) and 352.37 g of deionized water (as solvent). The proportion of the crosslinking agent relative to the monomer components was 0.14 mole percent.

While passing water at 50° C. through the jacket, the above aqueous solution was heated to 50° C. with stirring in a nitrogen atmosphere. Then, 10 g of a 11.6% (by weight) aqueous solution of 2,2'-azobis(2-amidinopropane) dihydrochloride (polymerization initiator; mol. wt. 271.27, product of Wako Pure Chemical Industries, Chemical V-50) was added, the mixture was stirred for 10 seconds and then the stirring was stopped and the mixture was allowed to stand. The proportion of the polymerization initiator relative to the monomer components was 0.2 mole percent.

Upon addition of the polymerization initiator, the polymerization reaction immediately started and, after the lapse of 90 minutes, the reactor inside temperature reached 100° C. (peak temperature). Thereafter, while passing warm water at 80° C. through the jacket, the contents were matured further for 30 minutes, whereby a hydrous gel was obtained. After completion of the reaction, the hydrous gel was ground to a finely divided state by rotating the blade and the reactor was then inverted and the hydrous gel was taken out.

The hydrous gel obtained was dried at 140° C. for 3 hours using a hot air circulating drier. After drying, the dried product was comminuted with a bench-top mill (manufactured by Kyoritsu Riko Corp.). A water-absorbing resin (1) with a mean particle size of 160 μm was thus obtained.

PRODUCTION EXAMPLE 2

A hydrophilic binder resin (b) was prepared in the following manner.

Thus, a 50-liter vessel type reactor equipped with a thermometer and a dropping device was charged with 0.45 kg of acrylic acid, 2.3 kg of ethyl acrylate, 0.25 kg of methyl methacrylate, 12 g of 2,2'-azobis(2,4-dimethylvaleronitrile) (polymerization initiator) and 3 kg of methyl alcohol (solvent). The dropping device was charged with a mixed solution composed of 1.05 kg of acrylic acid, 2.2 kg of methyl acrylate, 3.75 kg of methyl methacrylate, 26 g of 2,2'-azobis(2,4-dimethylvaleronitrile) and 7 kg of methyl alcohol.

The above methyl alcohol solution was heated at 65° C. with stirring in a nitrogen gas atmosphere and the reaction was thus allowed to proceed for 20 minutes. By doing so, the conversion of the contents was adjusted to 72%. Then, while the inside temperature was maintained at 65° C., the above mixed solution was added dropwise from the dropping device uniformly over 2 hours. After completion of the dripping, the contents were further allowed to mature at 65° C. for 3 hours. After completion of the reaction, 10 kg of methyl alcohol was admixed with the contents to give a 33% (by weight) methyl alcohol solution of a hydrophilic binder resin (1).

The thus-obtained hydrophilic binder resin (1) had a weight average molecular weight of 120,000 and an acid value of 115 mg KOH/g. The hydrophilic binder resin (1) was subjected to differential scanning calorimetry and it was found that the hydrophilic binder resin (1) had two glass transition temperatures within the range of −80° C. to 120° C. Further, the methyl alcohol solution of the hydrophilic binder resin (1) as obtained in the above manner was deprived of the solvent using a twin-screw extruder to give cylindrical pellets having a diameter of 3 mm and a length of 3 mm. A 10-g portion of the pellets were introduced into 500 g of a 0.4% (by weight) aqueous solution of sodium hydroxide as placed in a beaker at room temperature and the mixture was stirred using a magnetic stirrer. Complete dissolution was realized in 4 hours.

EXAMPLE 1

A friction reducing coating (1) for engineering works according to the present invention was prepared by admixing 50 parts by weight of the water-absorbing resin produced in Production Example 1 with 150 parts by weight of the 33% (by weight) methyl alcohol solution of the hydrophilic binder resin (1) produced in Production Example 2 and effecting dispersion. The thus-obtained friction reducing coating (1) for engineering works was uniformly applied by brushing to a 8.1-meter-long IV-sheet pile in a lower 7.5-meter portion (on both the front and reverse sides) to a thickness (after drying) of 200 μm, followed by drying to give a soil adhesion-preventig sheet pile (1) of the invention. After 1 hour of air drying, the coating film had a sufficient level of strength and could not be peeled off with ease even by hard scraping with an iron spatula.

The thus-obtained soil adhesion-preventing sheet pile (1) of the invention was driven into the ground (silt layer) in Shinagawa-ku, Tokyo using a vibro machine and, after the lapse of 1 month, it was extracted using the same vibro machine.

The conditions of adhesion of the soil on the soil adhesion-preventing sheet pile (1) after extraction and the condition of adhesion of the film formed by the friction reducing coating (1) were as summarized in Table 1. The photos taken on that occasion are shown in FIG. 2 (first from the left: convex (凸) surface: second: concave (凹) surface).

Figure 2:
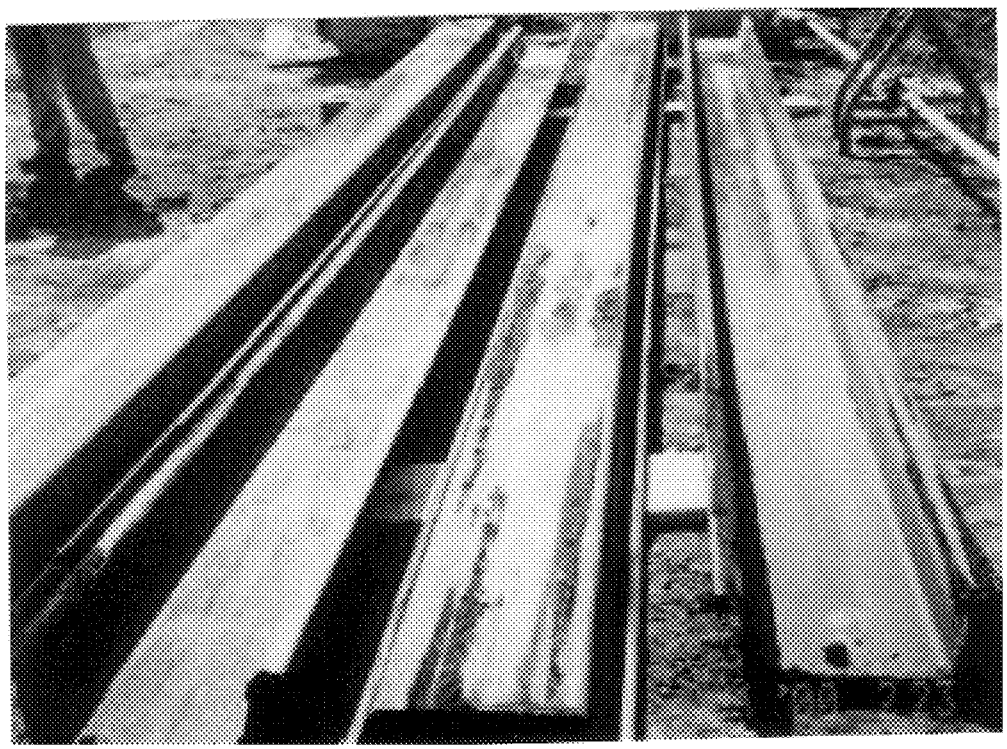
FIG. 2 is a photograph of the soil adhesion-preventing sheet piles (1) and (2) of Examples 1 and 2 after extraction thereof.

As can be seen from Table 1 and FIG. 2, the soil adhesion-preventing performance was very good, with almost no soil adhesion and almost no residual adhesion of the film formed from the friction reducing coating (1) being observed.

EXAMPLE 2

The same procedure as used in Example 1 was followed except that a soil adhesion-preventing sheet pile (2) obtained by applying the friction reducing coating (1) to a thickness of 400 μm was used. The conditions of adhesion of the soil on the soil adhesion-preventing sheet pile (2) after extraction and the condition of adhesion of the film formed by the friction reducing coating (1) were as summarized in Table 1. The photos taken on that occasion are shown in FIG. 2 (third from the left: convex surface: fourth: concave surface).

As can be seen from Table 1 and FIG. 2, almost no soil adhesion and almost no adhesion of the film resulting form the friction reducing coating (1) were observed except for the partial adhesion of the coating film in the upper part and the adhesion of a small amount of soil in the bottom part; the soil adhesion-preventing effect was thus good.

COMPARATIVE EXAMPLE 1

The same procedure as that of Example 1 was followed except that a comparative sheet pile (1) was used without applying the friction reducing coating (1). The conditions of adhesion of the soil on the comparative sheet pile (1) after extraction were as summarized in Table 1. The photos taken on that occasion are shown in FIG. 3.

Figure 3:
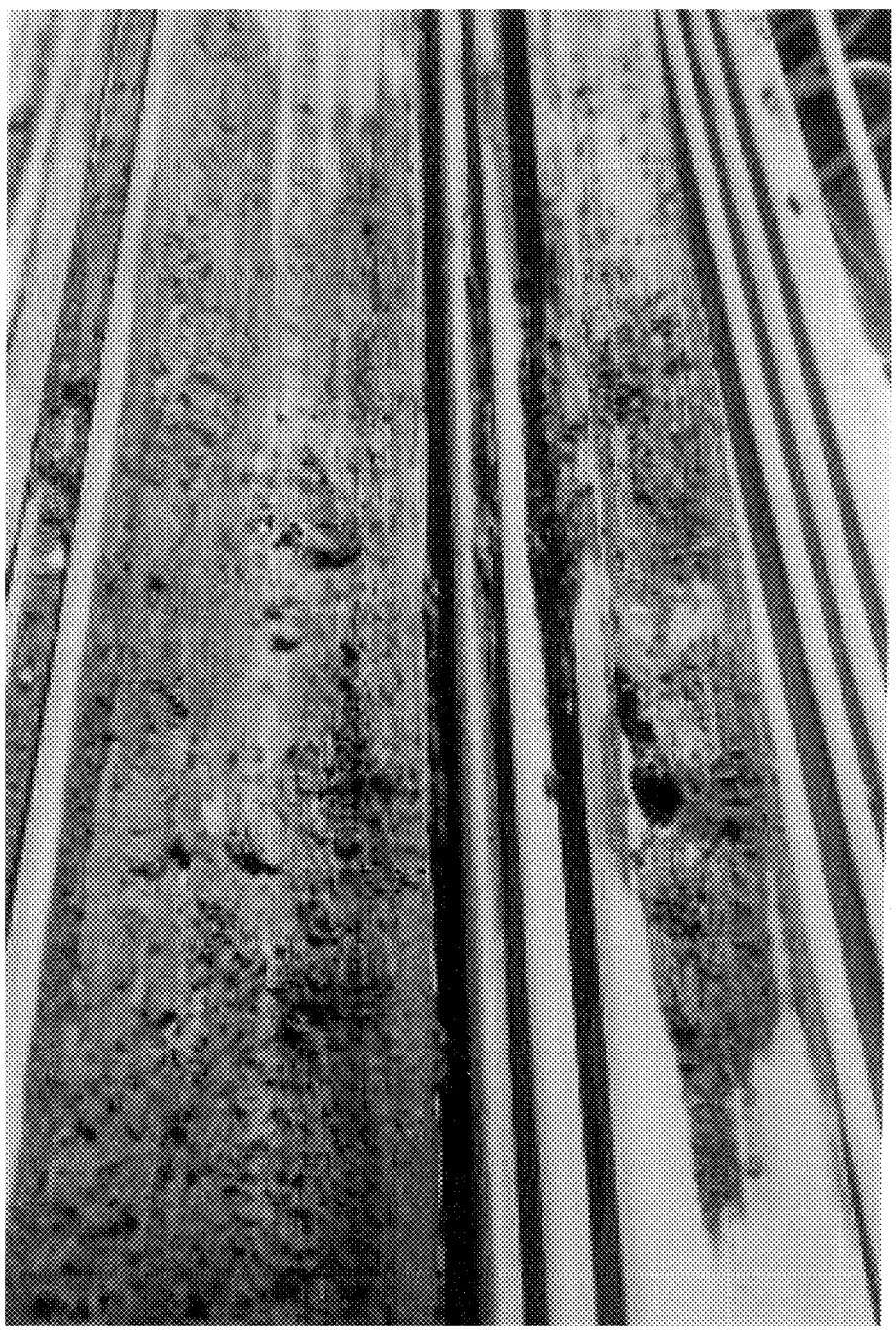
FIG. 3 is a photograph of the comparative sheet pile (1) of Comparative Example 1 after extraction thereof.

As can be seen from Table 1 and FIG. 3, soil was found adhering in large amounts everywhere over the comparative sheet pile (1) after extraction, revealing the complete lack of soil adhesion-preventing ability.

TABLE 1

|  |  | Example 1 |  | Example 2 |  | Comparative Example 1 |
|---|---|---|---|---|---|---|
| sheet pile |  | Soil adhesion-preventing pile (1) |  | Soil adhesion-preventing pile (2) |  | Comparative pile (1) |
| Film thickness (μm) |  | 200 |  | 400 |  | — |
| Surface |  | 凹 | 凸 | 凹 | 凸 | 凹 |
| Conditions of | 1 m | No adhesion | No adhesion | Residue of | Residue of | No adhesion |

TABLE 1-continued

| | | Example 1 | | Example 2 | | Comparative Example 1 |
|---|---|---|---|---|---|---|
| adhesion of soil and of the film of friction reducing coating (1) | (ground side) | | | coating film found | coating film found | |
| | 2 m | No adhesion | No adhesion | No adhesion | No adhesion | Small amount of soil adhering |
| | 3 m | No adhesion | No adhesion | No adhesion | No adhesion | soil adhering |
| | 4 m | No adhesion | No adhesion | No adhesion | No adhesion | |
| | 5m | No adhesion | No adhesion | No adhesion | No adhesion | Large amount of soil adhering |
| | 6 m | No adhesion | No adhesion | No adhesion | No adhesion | soil adhering |
| | 7 m | No adhesion | No adhesion | No adhesion | Slight amount of soil adhering | |
| | 8 m (underground side) | No adhesion | No adhesion | No adhesion | No adhesion | |

PRODUCTION EXAMPLE 3

A water-absorbing resin (a) was prepared in the following manner. Thus, a 1.5-liter jacketed desk kneader equipped with a thermometer and a blade (stirring blade) and lined with a trifluoroethylene resin on the inside surface was used as a reactor. The reactor was charged with 50.50 g of methoxypolyethylene glycol methacrylate (mol. wt. 512), 4.30 g of methacrylic acid (mol. wt. 86.09), 220.00 g of sodium methacrylate (mol. wt. 108), 1.4 g of polyethylene glycol diacrylate (as crosslinking agent) and 340.05 g of deionized water (as solvent). The proportion of the crosslinking agent relative to the monomer components was 0.13 mole percent.

While passing warm water at 50° C. through the jacket, the above aqueous solution was heated to 50° C. with stirring in a nitrogen atmosphere. Then, 10 g of a 11.6% (by weight) aqueous solution of 2,2'-azobis(2-amidinopropane) dihydrochloride (polymerization initiator; mol. wt. 271.27, product of Wako Pure Chemical Industries, Chemical V-50) was added, the mixture was stirred for 10 seconds and then the stirring was stopped and the mixture was allowed to stand. The proportion of the polymerization initiator relative to the monomer components was 0.2 mole percent.

Upon addition of the polymerization initiator, the polymerization reaction immediately started and, after the lapse of 95 minutes, the reactor inside temperature reached 100° C. (peak temperature). Thereafter, while passing warm water at 80° C. through the jacket, the contents were matured further for 30 minutes, whereby a hydrous gel was obtained. After completion of the reaction, the hydrous gel was ground to a finely divided state by rotating the blade and the reactor was then inverted and the hydrous gel was taken out.

The hydrous gel obtained was dried at 140° C. for 3 hours using a hot air circulating drier. After drying, the dried product was comminuted with a bench-top mill (manufactured by Kyoritsu Riko Corp.). A water-absorbing resin (2) with a mean particle size of 180 μm was thus obtained.

PRODUCTION EXAMPLE 4

A hydrophilic binder resin (b) was prepared in the following manner.

Thus, a 50-liter vessel type reactor equipped with a thermometer and a dropping device was charged with 0.40 kg of acrylic acid, 2.45 kg of ethyl acrylate, 0.15 kg of methyl methacrylate, 10 g of 2,2'-azobis(2,4-dimethylvaleronitrile) (polymerization initiator) and 3 kg of methyl alcohol (solvent). The dropping device was charged with a mixed solution composed of 0.93 kg of acrylic acid, 2.22 kg of methyl acrylate, 3.85 kg of methyl methacrylate, 23 g of 2,2'-azobis(2,4-dimethylvaleronitrile) and 7 kg of methyl alcohol.

The above methyl alcohol solution was heated at 65° C. with stirring in a nitrogen gas atmosphere and the reaction was thus allowed to proceed for 20 minutes. By doing so, the conversion of the contents was adjusted to 72%. Then, while the inside temperature was maintained at 65° C., the above mixed solution was added dropwise from the dropping device uniformly over 2 hours. After completion of the dripping, the contents were further allowed to mature at 65° C. for 3 hours. After completion of the reaction, 10 kg of methyl alcohol was admixed with the contents to give a 33% (by weight) methyl alcohol solution of a hydrophilic binder resin (2).

The thus-obtained hydrophilic binder resin (2) had a weight average molecular weight of 140,000 and an acid value of 104 mg KOH/g. The hydrophilic binder resin (2) was subjected to differential scanning calorimetry and it was found that the hydrophilic binder resin (2) had two glass transition temperatures within the range of −80° C. to 120° C. Further, the methyl alcohol solution of the hydrophilic binder resin (2) as obtained in the above manner was deprived of the solvent using a twin-screw extruder to give cylindrical pellets having a diameter of 3 mm and a length of 3 mm. A 10-g portion of the pellets were introduced into 500 g of a 0.4% (by weight) aqueous solution of sodium hydroxide as placed in a beaker at room temperature and the mixture was stirred using a magnetic stirrer. Complete dissolution was realized in 4 hours.

PRODUCTION EXAMPLE 5

A hydrophilic binder resin (b) was prepared in the following manner. Thus, a 50-liter vessel type reactor equipped with a thermometer and a dropping device was charged with 0.473 kg of acrylic acid, 1.725 kg of methyl acrylate, 2.45 kg of ethyl acrylate, 2.85 kg of methyl methacrylate, 33 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (3) was obtained. The hydrophilic binder resin (3) obtained had a weight average molecular weight of 100,000 and an acid value of 46 mg KOH/g.

PRODUCTION EXAMPLE 6

A hydrophilic binder resin (b) was prepared in the following manner. Thus, a 50-liter vessel type reactor equipped with a thermometer and a dropping device was charged with 4.7 kg of acrylic acid, 1.725 kg of methyl acrylate, 1.18 kg of ethyl acrylate, 33 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (4) was obtained. The hydrophilic binder resin (4) obtained had a weight average molecular weight of 120,000 and an acid value of 480 mg KOH/g.

COMPARATIVE PRODUCTION EXAMPLE 1

A binder resin (1) for comparison was prepared in the following manner. Thus, a 50-liter vessel type reactor equipped with a thermometer and a dropping device was charged with 0.187 kg of acrylic acid, 2.011 kg of methyl acrylate, 2.45 kg of ethyl acrylate, 2.85 kg of methyl methacrylate, 33 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (1) for comparison was obtained. The thus-obtained binder resin (1) for comparison had a weight average molecular weight of 110,000 and an acid value of 19 mg KOH/g.

COMPARATIVE PRODUCTION EXAMPLE 2

A binder resin (2) for comparison was prepared in the following manner. Thus, a 50-liter vessel type reactor equipped with a thermometer and a dropping device was charged with 5.87 kg of acrylic acid, 1.735 kg of methyl acrylate, 33 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a binder resin (2) for comparison was obtained. The thus-obtained binder resin (2) for comparison had a weight average molecular weight of 110,000 and an acid value of 600 mg KOH/g.

EXAMPLE 3

A friction reducing coating (2) for engineering works according to the present invention was prepared by admixing 50 parts by weight of the water-absorbing resin produced in Production Example 3 with 150 parts by weight of the 33% (by weight) methyl alcohol solution of the hydrophilic binder resin (2) produced in Production Example 4 and effecting dispersion. The thus-obtained friction reducing coating (2) for engineering works was uniformly applied by brushing to the surface (each of the inside and outside) of a steel pipe having a thickness of 1 mm, a diameter of 50 mm and a length of 500 mm to a thickness (after drying) of 200 $\mu$m. After 1 hour of air drying, the coating film had a sufficient level of strength and could not be peeled off with ease even by hard scraping with an iron spatula.

The thus-obtained steel pipe after application of the friction reducing coating (2) for engineering works was first immersed in deionized water for 10 minutes. The steel pipe surface after immersion was covered with the friction reducing agent layer resulting from absorption of water and swelling and was slimy.

Then, this steel pipe was put up vertically on the ground in an applicant's factory site (Suita City, Osaka Prefecture) and, after placing a steel sheet, 3 mm in thickness and 60 mm×60 mm in size, on the steel pipe, the steel pipe was driven into the ground by 10 repetitions of hitting the steel sheet with a hammer weighing 500 grams from a height of 60 cm. The depth (from the ground surface) to which the pipe was driven into the ground on that occasion was as shown in Table 2. After allowing this steel pipe to stand for 1 day and, on the next day, about 500 ml of deionized water was first poured over the steel pipe surfaces (both inside and outside) and the system was allowed to stand for about 10 minutes. After standing, the pipe steel surfaces were covered with the friction reducing agent layer resulting from water absorption and swelling and were slimy. Then, the steel pipe was further driven into the ground in the same manner as on the first day. The depth (from the ground surface) to which the pipe was further driven into the ground on that occasion was as shown in Table 2. After allowing the steel pipe to stand further for 1 day, it was driven into the ground by the same procedure as on the second day. The depth (from the ground surface) to which it was further driven into the ground was as shown in table 2.

Throughout the above three-day testing, the depth of pipe driving from the ground surface was much greater as compared with the pile used without applying the friction reducing coating (2) and that depth did not change substantially throughout the 3 days. These results indicate that the application of the friction reducing coating (2) for engineering works according to the invention to the substrate surface resulted in retention of a friction reducing agent layer on the substrate surface over 3 days and, thus, in production of the friction reducing effect.

EXAMPLE 4

The same procedure as used in Example 3 was followed except that the friction reducing coating (2) was applied to a thickness of 300 $\mu$m (after drying). The depths of pile driving from the ground surface as measured on that occasion were as shown in Table 2.

Throughout the above three-day testing, the depth of pipe driving from the ground surface was much greater as compared with the pile used without applying the friction reducing coating (2) and that depth did not change substantially throughout the 3 days. These results also indicate, like the results of Example 3, that the application of the friction reducing coating (2) for engineering works according to the invention to the substrate surface resulted in retention of a friction reducing agent layer on the substrate surface over 3 days and, thus, in production of the friction reducing effect.

EXAMPLE 5

The same procedure as used in Example 3 was followed except that a friction reducing coating (3) prepared in the same manner as the friction reducing coating (2) except that the hydrophilic binder resin (3) produced in Production Example 5 was used in the same amount as that of, and in lieu of, the hydrophilic binder resin (2) produced in Production Example 4. The depths of pile driving from the ground surface as measured on that occasion were as shown in Table 2.

Throughout the above three-day testing, the depth of pipe driving from the ground surface was much greater as compared with the pile used without applying the friction reducing coating (3) and that depth did not change substantially throughout the 3 days. These results, like the results of Examples 3 and 4, also indicate that the application of the friction reducing coating (3) for engineering works according to the invention to the substrate surface resulted in retention of a friction reducing agent layer on the substrate surface over 3 days and, thus, in production of the friction reducing effect.

EXAMPLE 6

The same procedure as used in Example 3 was followed except that a friction reducing coating (4) prepared in the same manner as the friction reducing coating (2) except that the hydrophilic binder resin (4) produced in Production Example 6 was used in the same amount as that of, and in lieu of, the hydrophilic binder resin (2) produced in Production Example 4. The depths of pile driving from the ground surface as measured on that occasion were as shown in Table 2.

Throughout the above three-day testing, the depth of pipe driving from the ground surface was much greater as compared with the pile used without applying the friction reducing coating (4) and that depth did not change substantially throughout the 3 days. These results, like the results of Examples 3, 4 and 5, also indicate that the application of the friction reducing coating (4) for engineering works according to the invention to the substrate surface resulted in retention of a friction reducing agent layer on the substrate surface over 3 days and, thus, in production of the friction reducing effect.

COMPARATIVE EXAMPLE 2

The same procedure as used in Example 3 was followed except that the application of the friction reducing coating (2) was omitted. The depths of pile driving from the ground surface as measured on that occasion were as shown in Table 2.

Throughout the above three-day testing, the depth of pipe driving from the ground surface was much smaller as compared with the pile coated with the friction reducing coating (2). These results indicate that when the application of the friction reducing coating (2) for engineering works according to the invention is fully omitted, the efficiency of substrate driving works becomes very low, markedly differing from Examples 3 to 6.

COMPARATIVE EXAMPLE 3

The same procedure as used in Example 3 was followed except that a species of grease (product of Showa Shell) was applied to a thickness of 200 μm in lieu of applying the friction reducing coating (2) to a thickness of 200 μm. The depths of pile driving from the ground surface as measured on that occasion were as shown in Table 2.

Throughout the above three-day testing, the depth of pipe driving from the ground surface on the first day was substantially the same as in the case of the pile coated with the friction reducing coating (2) but, on the second and third days, it became significantly smaller and almost at the same level as that of the pile having no coating at all. These results indicate that the application of grease produces its friction reducing effect only temporarily without any sustained effect, markedly differing from Examples 3 to 6, and thus, on the second and subsequent days, almost no friction reducing effect is produced.

COMPARATIVE EXAMPLE 4

The same procedure as used in Example 3 was followed except that a comparative coating (1) prepared in the same manner as the friction reducing coating (2) except that the hydrophilic binder resin (1) for comparison produced in Comparative Production Example 1 was used in the same amount as that of, and in lieu of, the hydrophilic binder resin (2) produced in Production Example 4. The depths of pile driving from the ground surface as measured on that occasion were as shown in Table 2.

Throughout the above three-day testing, the depth of pipe driving from the ground surface was smaller as compared with the pile coated with the friction reducing coating from (2) to (4) and almost at the same level as compared with the pile coated with Comparative Example 2 having no coating at all.

COMPARATIVE EXAMPLE 5

The same procedure as used in Example 3 was followed except that a Comparative coating (2) prepared in the same manner as the friction reducing coating (2) except that the hydrophilic binder resin (2) for comparison produced in Comparative Production Example 2 was used in the same amount as that of, and in lieu of, the hydrophilic binder resin (2) produced in Production Example 4. The depths of pile driving from the ground surface as measured on that occasion were as shown in Table 2.

Throughout the above three-day testing, the depth of pipe driving from the ground surface on the first day was substantially the same as in the case of the pile coated with the friction reducing coating from (2) to (4) but, on the second and third says, it became significantly smaller and almost at the same level as that of the pile having no coating at all. These results indicate that the application of the binder resin (2) for comparison having an acid value of 600 mg KOH/g produces its friction reducing effect only temporarily without any sustained effect, markedly differing from Examples 3 to 6, and thus, on the second and subsequent days, almost no friction reducing effect is produced.

TABLE 2

|  | Example 3 | Example 4 | Example 5 | Example 6 | Compar. Ex. 2 | Compar. Ex. 3 | Compar. Ex. 4 | Compar. Ex. 5 |
| --- | --- | --- | --- | --- | --- | --- | --- | --- |
| Friction reducing agent | Friction reducing coating for engineering works (2) | Friction reducing coating for engineering works (2) | Friction reducing coating for engineering works (3) | Friction reducing coating for engineering works (4) | — | Grease | Comparative friction reducing coating for engineering works (1) | Comparative friction reducing coating for engineering works (2) |
| Binder acid value (mgKOH/g) | 104 | 104 | 46 | 460 | — | — | 19 | 600 |
| Film thickness (μm) | 200 | 300 | 200 | 200 | — | 200 | 200 | 200 |

TABLE 2-continued

|  |  | Example 3 | Example 4 | Example 5 | Example 6 | Compar. Ex. 2 | Compar. Ex. 3 | Compar. Ex. 4 | Compar. Ex. 5 |
|---|---|---|---|---|---|---|---|---|---|
| Depth of driving (cm) | Day 1 | 16 | 16 | 15 | 16 | 7 | 13 | 9 | 18 |
|  | Day 2 | 14 | 16 | 15 | 15 | 7 | 9 | 9 | 10 |
|  | Day 3 | 15 | 16 | 15 | 14 | 6 | 7 | 10 | 7 |
|  | 3 days' total | 45 | 48 | 45 | 45 | 20 | 29 | 28 | 35 |
| Friction reducing effect |  | ◯ | ◯ | ◯ | ◯ | X | X | X | Δ |
| Sustained release property |  | ◯ | ◯ | ◯ | ◯ | — | X | — | X |

Friction reducing effect: Evaluated in terms of the total depth of driving for the 3 days; ◯: not less than 40 cm, Δ: 30–39 cm, X: not more than 29 cm.
Sustained release property: Evaluated in terms of difference in driving depth between the first day and third day (for Comparative Example 2 in which there was no friction reducing effect from the beginning, no evaluation was made); ◯: difference in driving depth not more than −2 cm, Δ: difference in driving depth −3 to −4 cm, X: difference in driving depth not less than −5 cm (difference in driving depth = driving depth on day 3 − driving depth on day 1).

PRODUCTION EXAMPLE 7

A water-absorbing resin was prepared in the following manner. Thus, a 1.5-liter jacketed desk kneader equipped with a thermometer and a blade (stirring blade) and lined with a trifluoroethylene resin on the inside surface was used as a reactor. The reactor was charged with 55.18 g of methoxypolyethylene glycol methacrylate (mol. wt. 512), 3.76 g of methacrylic acid (mol. wt. 86.09), 215.69 g of sodium methacrylate (mol. wt. 108), 1.4 g of polyethylene glycol diacrylate (as crosslinking agent) and 352.37 g of deionized water (as solvent). The proportion of the crosslinking agent relative to the monomer components was 0.15 mole percent.

While passing warm water at 50° C. through the jacket, the above aqueous solution was heated to 50° C. with stirring in a nitrogen atmosphere. Then, 10 g of a 11.6% (by weight) aqueous solution of 2,2'-azobis(2-amidinopropane) dihydrochloride (polymerization initiator; mol. wt. 271.27, product of Wako Pure Chemical Industries, Chemical V-50) was added, the mixture was stirred for 10 seconds and then the stirring was stopped and the mixture was allowed to stand. The proportion of the polymerization initiator relative to the monomer components was 0.2 mole percent.

Upon addition of the polymerization initiator, the polymerization reaction immediately started and, after the lapse of 90 minutes, the reactor inside temperature reached 100° C. (peak temperature). Thereafter, while passing warm water at 80° C. through the jacket, the contents were matured further for 30 minutes, whereby a hydrous gel was obtained. After completion of the reaction, the hydrous gel was ground to a finely divided state by rotating the blade and the reactor was then inverted and the hydrous gel was taken out.

The hydrous gel obtained was dried at 140° C. for 3 hours using a hot air circulating drier. After drying, the dried product was comminuted with a bench-top mill (manufactured by Kyoritsu Riko Corp.). A water-absorbing resin (3) with a mean particle size of 150 μm was thus obtained.

PRODUCTION EXAMPLE 8

A hydrophilic binder resin (b) was prepared in the following manner.

Thus, a 50-liter vessel type reactor equipped with a thermometer and a dropping device was charged with 0.45 kg of acrylic acid, 2.4 kg of ethyl acrylate, 0.15 kg of methyl methacrylate, 12 g of 2,2'-azobis(2,4-dimethylvaleronitrile) (polymerization initiator) and 3 kg of methyl alcohol (solvent). The dropping device was charged with a mixed solution composed of 1.05 kg of acrylic acid, 2.1 kg of methyl acrylate, 3.85 kg of methyl methacrylate, 28 g of 2,2'-azobis(2,4-dimethylvaleronitrile) and 7 kg of methyl alcohol.

The above methyl alcohol solution was heated at 65° C. with stirring in a nitrogen gas atmosphere and the reaction was thus allowed to proceed for 20 minutes. By doing so, the conversion of the contents was adjusted to 72%. Then, while the inside temperature was maintained at 65° C., the above mixed solution was added dropwise from the dropping device uniformly over 2 hours. After completion of the dripping, the contents were further allowed to mature at 65° C. for 3 hours. After completion of the reaction, 10 kg of methyl alcohol was admixed with the contents to give a 33% (by weight) methyl alcohol solution of a hydrophilic binder resin (5).

The thus-obtained hydrophilic binder resin (5) had a weight average molecular weight of 130,000 and an acid value of 117 mg KOH/g. The hydrophilic binder resin (5) was subjected to differential scanning calorimetry and it was found that the hydrophilic binder resin (5) had two glass transition temperatures within the range of −80° C. to 120° C. Further, the methyl alcohol solution of the hydrophilic binder resin (5) as obtained in the above manner was deprived of the solvent using a twin-screw extruder to give cylindrical pellets having a diameter of 3 mm and a length of 3 mm. A 10-g portion of the pellets were introduced into 500 g of a 0.4% (by weight) aqueous solution of sodium hydroxide as placed in a beaker at room temperature and the mixture was stirred using a magnetic stirrer. Complete dissolution was realized in 4 hours.

PRODUCTION EXAMPLE 9

A hydrophilic binder resin (b) was prepared in the following manner. Thus, a 50-liter vessel type reactor equipped with a thermometer and a dropping device was charged with 0.525 kg of acrylic acid, 1.725 kg of methyl acrylate, 2.4 kg of ethyl acrylate, 2.85 kg of methyl methacrylate, 30 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (6). The thus-obtained hydrophilic binder resin had a weight average molecular weight of 110,000 and an acid value of 51 mg KOH/g.

EXAMPLE 7

A friction reducing coating (5) for engineering works according to the present invention was prepared by admixing 50 parts by weight of the water-absorbing resin produced in Production Example 7 with 150 parts by weight of the 33% (by weight) methyl alcohol solution of the hydrophilic binder resin (5) produced in Production Example 8 and effecting dispersion. The thus-obtained friction reducing coating (5) for engineering works was uniformly applied by brushing to the surface (each of the inside and outside) of a steel pipe having a thickness of 1 mm, a diameter of 50 mm and a length of 500 mm to a thickness (after drying) of 200 $\mu$m. After 1 hour of air drying, the coating film had a sufficient level of strength and could not be peeled off with ease even by hard scraping with an iron spatula.

The thus-obtained steel pipe after application of the friction reducing coating (5) for engineering works was first immersed in deionized water for 10 minutes. The steel pipe surface after immersion was covered with the friction reducing agent layer resulting from absorption of water and swelling and was slimy.

Then, this steel pipe was put up vertically on the ground in an applicant's factory site (Suita City, Osaka Prefecture) and, after placing a steel sheet, 3 mm in thickness and 60 mm×60 mm in size, on the steel pipe, the steel pipe was driven into the ground by 10 repetitions of hitting the steel sheet with a hammer weighing 500 grams from a height of 60 cm. The depth (from the ground surface) to which the pipe was driven into the ground on that occasion was as shown in Table 5. After allowing this steel pipe to stand for 1 day and, on the next day, about 500 ml of deionized water was first poured over the steel pipe surfaces (both inside and outside) and the system was allowed to stand for about 10 minutes. After standing, the pipe steel surfaces were covered with the friction reducing agent layer resulting from water absorption and swelling and were slimy. Then, the steel pipe was further driven into the ground in the same manner as on the first day. The depth (from the ground surface) to which the pipe was further driven into the ground on that occasion was as shown in Table 5. After allowing the steel pipe to stand further for 1 day, it was driven into the ground by the same procedure as on the second day. The depth (from the ground surface) to which it was further driven into the ground was as shown in Table 5.

Throughout the above three-day testing, the depth of pipe driving from the ground surface was much greater as compared with the pile used without applying the friction reducing coating (5) and that depth did not change substantially throughout the 3 days. These results indicate that the application of the friction reducing coating (5) for engineering works according to the invention to the substrate surface resulted in retention of a friction reducing agent layer on the substrate surface over 3 days and, thus, in production of the friction reducing effect.

EXAMPLE 8

The same procedure as used in Example 7 was followed except that the friction reducing coating was applied to a thickness of 400 $\mu$m (after drying). The depths of pile driving from the ground surface as measured on that occasion were as shown in Table 5.

Throughout the above three-day testing, the depth of pipe driving from the ground surface was much greater as compared with the pile used without applying the friction reducing coating (5) and that depth did not change substantially throughout the 3 days. These results also indicate, like the results of Example 7, that the application of the friction reducing coating (5) for engineering works according to the invention to the substrate surface resulted in retention of a friction reducing agent layer on the substrate surface over 3 days and, thus, in production of the friction reducing effect.

EXAMPLE 9

The same procedure as used in Example 7 was followed except that a friction reducing coating (6) prepared in the same manner as the friction reducing coating (5) except that the hydrophilic binder resin (6) was used in the same amount as that of, and in lieu of, the hydrophilic binder resin (5). The depths of pile driving from the ground surface as measured on that occasion were as shown in Table 5.

Throughout the above three-day testing, the depth of pipe driving from the ground surface was much greater as compared with the pile used without applying the friction reducing coating (6) and that depth did not change substantially throughout the 3 days. These results, like the results of Examples 7 and 8, also indicate that the application of the friction reducing coating (6) for engineering works according to the invention to the substrate surface resulted in retention of a friction reducing agent layer on the substrate surface over 3 days and, thus, in production of the friction reducing effect.

COMPARATIVE EXAMPLE 6

The same procedure as used in Example 7 was followed except that the application of the friction reducing coating (5) was omitted. The depths of pile driving from the ground surface as measured on that occasion were as shown in Table 5.

Throughout the above three-day testing, the depth of pipe driving from the ground surface was much smaller as compared with the pile coated with the friction reducing coating (5). These results indicate that when the application of the friction reducing coating (5) for engineering works according to the invention is fully omitted, the efficiency of substrate driving works becomes very low, markedly differing from Examples 7 to 9.

COMPARATIVE EXAMPLE 7

The same procedure as used in Example 7 was followed except that a species of grease (product of Showa Shell) was applied to a thickness of 200 $\mu$m in lieu of applying the friction reducing coating (5) to a thickness of 200 $\mu$m. The depths of pile driving from the ground surface as measured on that occasion were as shown in Table 5.

Throughout the above three-day testing, the depth of pipe driving from the ground surface on the first day was substantially the same as in the case of the pile coated with the friction reducing coating (5) or (6) but, on the second and third says, it became significantly smaller and almost at the same level as that of the pile having no coating at all. These results indicate that the application of grease produces its friction reducing effect only temporarily without any sustained effect, markedly differing from Examples 7 to 9, and thus, on the second and subsequent days, almost no friction reducing effect is produced.

COMPARATIVE EXAMPLE 8

The same procedure as used in Example 7 was followed except that a comparative friction reducing coating (3) for engineering works with a composition shown in Table 3 was used. The results are shown in Table 5. The composition of the aqueous styrene-acrylic resin solution contained in the comparative friction reducing coating (3) was as shown in Table 4. When the comparative friction reducing coating (3) was applied, the friction reducing effect was lower than in the case where grease was used; any sustained release property was not observed.

TABLE 3

| Material | Styrene-acrylic resin aqueous solution | Acrylic emulsion (acid value 100) | Calcium carbonate |
|---|---|---|---|
| Composition (% by weight) | 25 | 25 | 50 |

TABLE 4

| Material | Styrene-acrylic resin flakes | 25% Aqueous ammonia | Isopropyl alcohol | Propylene glycol | Water |
|---|---|---|---|---|---|
| Composition | 34.0 | 8.1 | 3.0 | 1.5 | 53.4 |

COMPARATIVE EXAMPLE 9

The same procedure as used in Example 7 was followed except that a polymethyl methacrylate latex (solid content 40%) was first applied to the substrate to a film thickness (after drying) of 100 μm and, prior to drying of the thus-formed coating film, a vinyl alcohol-sodium acrylate copolymer-based water-absorbing resin powder was dusted and immobilized on the coating film in the same amount (100 g/m$^2$) as the solids in the coating film. The results are shown in Table 5. When the volatile film-forming resin composition and highly water-absorbing resin were used in that manner, almost no friction reducing effect was observed and almost no sustained release property was observed.

COMPARATIVE EXAMPLE 10

The same procedure as used in Example 7 was followed except that the aqueous styrene-acrylic resin solution having the composition shown in Table 4 (acid value 200 mg KOH/g) was first applied to the substrate to a film thickness (after drying) of 100 μm and, prior to drying of the thus-formed coating film, a vinyl alcohol-sodium acrylate copolymer-based water-absorbing resin powder was dusted and immobilized on the coating film in the same amount (100 g/m$^2$) as the solids in the coating film. The results are shown in Table 5. When the acrylic resin coating and highly water-absorbing resin were used in that manner, almost no friction reducing effect was observed and almost no sustained release property was observed.

TABLE 5

| | | Example 7 | Example 8 | Example 9 | Compar. Ex. 6 | Compar. Ex. 7 | Compar. Ex. 8 | Compar. Ex. 9 | Compar. Ex. 10 |
|---|---|---|---|---|---|---|---|---|---|
| Friction reducing coating for civil engineering works | | Friction reducing coating (5) | Friction reducing coating (6) | — | Grease | Comparative friction reducing coating (3) | Polymethyl methacrylate latex + vinyl alcohol-sodium acrylate copolymer-based water-absorbing resin powder | Aqueous styrene-acrylic resin solution + vinyl alcohol-sodium acrylate copolymer-based water absorbing resin powder |
| Film thickness (μm) | | 200 | 400 | 200 | — | 200 | 200 | 100+ Water-absorbing resin powder | 100+ Water absorbing resin powder |
| Depth of driving (cm) | Day 1 | 16 | 16 | 15 | 8 | 14 | 11 | 9 | 10 |
| | Day 2 | 15 | 16 | 16 | 7 | 10 | 7 | 6 | 7 |
| | Day 3 | 16 | 15 | 15 | 6 | 8 | 6 | 6 | 6 |
| | 3 days' total | 46 | 46 | 45 | 21 | 32 | 23 | 21 | 23 |
| Friction reducing effect | | ○ | ○ | ○ | X | Δ | X | X | X |
| Sustained release property | | ○ | ○ | ○ | — | X | X | Δ | Δ |

Friction reducing effect: Evaluated in terms of the total depth of driving for the 3 days; ○: not less than 40 cm, Δ: 30–39 cm, X: not more than 29 cm.

Sustained release property: Evaluated in terms of difference in driving depth between the first day and third day (for Comparative Example 6 in which there was no friction reducing effect from the beginning, no evaluation was made); ○: difference in driving depth not more than −2 cm, Δ: difference in driving depth −3 to −4 cm, X: difference in driving depth not less than −5 cm (difference in driving depth = driving depth on day 3 − driving depth on day 1).

INDUSTRIAL APPLICABILITY

The friction reducing coating for engineering works according to the invention, which has the above-mentioned constitution can be applied to substrates to be buried underground in a simple and easy manner to form thereon a friction reducing coating film for engineering works which is hardly peeled off from the substrates in the step of laying the substrates underground and, when used for preventing the adhesion between the substrate surface and ground (soil), reduces the adhesiveness between the substrates and the surrounding ground in the step of extracting the substrates and thus allows almost no soil adhesion to the substrates during and after extraction without markedly producing such adverse effects as pulling up the surrounding ground, with the result that the space after extraction of the substrates can be minimized (the volume of the space being almost the same as the volume of the temporary work substrates themselves), hence the amounts of the necessary agent(s), earth and sand required for post-treatment (back-filling) can be minimized. When the coating is used for reducing the friction between the substrate surface and ground (soil), the friction reducing coating for engineering works is applied in advance to substrates to be used in carrying out, for example, the negative friction cut construction method for burying underground structures in the ground or the caisson construction method for laying various tanks and water storage tanks underground or the pipe jacking construction method for burying (horizontally or vertically) various Hume pipes, sheet piles, steel tubular pipes, steel pipes, steel pipe piles and so forth in the ground. In the case of negative friction cut construction method, for instance, the necessary portion (friction reducing layer portion) will not be peeled off in the step of laying or burying but the coating film absorbs water in the ground after a certain period of time and thereon and thus swells and provides a friction reducing agent layer to the interface between the substrate and ground over a prolonged period of time, whereby the foundation structures can be protected from ground changes such as ground subsidence. In the case of caisson construction method or pipe jacking construction method, the coating film absorbs water from soil and thus can feed a friction reducing agent layer to the interface between the substrate surface and soil in a sustained manner throughout the term of construction work to thereby reduce the friction and make it easy to lay the substrates underground (speedup of laying, reduction in pushing force, etc.).

What is claimed is:

1. A friction reducing coating for engineering works comprising a water-absorbing resin (a), a hydrophilic binder resin (b) and a solvent (c) as essential components, wherein said hydrophilic binder resin (b) has an acid value of 40 mg KOH/g to 500 mg KOH/g.

2. The friction reducing coating for engineering works according to claim 1, wherein said water-absorbing resin (a) is a salt-resistant, water-absorbing resin.

3. The friction reducing coating for engineering works according to claim 1, which forms a friction reducing agent layer to the surface of a substrate, said friction reducing agent layer is supplied with sustained release between the substrate surface and the ground (soil).

4. A soil adhesion-preventing sheet pile or steel tubular pipe wherein the friction reducing coating for engineering works according to claim 1 has been applied thereto.

5. A soil adhesion-preventing construction method for the prevention of ground (soil) adhesion to a substrate surface which comprises utilizing (1) a friction reducing coating for engineering works comprising a water-absorbing resin (a), a hydrophilic binder resin (b) and a solvent (c) as essential components, wherein said hydrophilic binder resin (b) has an acid value of 40 mg KOH/g to 500 mg KOH/g or (2) a soil adhesion-preventing sheet pile and/or steel tubular pipe wherein a friction reducing coating according to (1) has been applied thereto.

6. A negative friction cut construction method, caisson construction method or pipe jacking construction method which comprises utilizing the friction reducing coating for engineering works according to claim 1.

7. The friction reducing coating for engineering works according to claim 1 or 2, which forms a friction reducing agent layer on the surface of a substrate, wherein said friction reducing agent layer is a lubricating gel layer.

8. The friction reducing coating for engineering works according to claim 1 or 2, which forms a friction reducing agent layer on the surface of a substrate, wherein said friction reducing agent layer prevents adhesion between the substrate surface and soil or reduces the friction between the substrate surface and soil.

9. The friction reducing coating for engineering works according to claim 1 or 2, wherein said hydrophilic binder resin (b) is a (meth)acrylate ester copolymer.

* * * * *